United States Patent
Lof et al.

(10) Patent No.: US 6,670,721 B2
(45) Date of Patent: Dec. 30, 2003

(54) SYSTEM, METHOD, ROTATING MACHINE AND COMPUTER PROGRAM PRODUCT FOR ENHANCING ELECTRIC POWER PRODUCED BY RENEWABLE FACILITIES

(75) Inventors: Per-Anders Kristian Lof, Vallingby (SE); Lars Gustaf Ingolf Gertmar, Vasteras (SE)

(73) Assignee: ABB AB, Vasteras (SE)

( * ) Notice: Subject to any disclaimer, the term of this patent is extended or adjusted under 35 U.S.C. 154(b) by 16 days.

(21) Appl. No.: 09/900,874

(22) Filed: Jul. 10, 2001

(65) Prior Publication Data

US 2003/0011348 A1 Jan. 16, 2003

(51) Int. Cl.⁷ .................................................. H02J 3/00
(52) U.S. Cl. ............................. 290/44; 290/2; 322/37; 307/31
(58) Field of Search ........................... 322/20, 21, 22, 322/36, 37; 290/2, 43, 44, 52; 307/31, 57, 112

(56) References Cited

U.S. PATENT DOCUMENTS

| | | | | |
|---|---|---|---|---|
| 4,941,079 | A | | 7/1990 | Ooi ............................ 363/132 |
| 5,083,039 | A | | 1/1992 | Richardson et al. .......... 290/44 |
| 5,225,712 | A | | 7/1993 | Erdman ....................... 290/44 |
| 6,137,187 | A | * | 10/2000 | Mikhail et al. ............... 290/44 |
| 6,429,546 | B1 | * | 8/2002 | Ropp et al. ................... 307/31 |
| 2001/0043013 | A1 | * | 11/2001 | Abe ............................. 307/66 |
| 2002/0079706 | A1 | * | 6/2002 | Rebsdorf et al. ............. 290/55 |
| 2002/0195821 | A1 | * | 12/2002 | Wacknov ..................... 290/12 |
| 2003/0006613 | A1 | * | 1/2003 | Lof et al. ..................... 290/44 |

FOREIGN PATENT DOCUMENTS

| | | |
|---|---|---|
| WO | WO 97/45847 | 12/1997 |
| WO | WO 97/45907 | 12/1997 |
| WO | WO 97/45919 | 12/1997 |
| WO | WO 99/29008 | 6/1999 |
| WO | WO 00/67355 | 11/2000 |
| WO | WO 00/67358 | 11/2000 |
| WO | WO 00/67363 | 11/2000 |
| WO | WO 01/48892 | 7/2001 |
| WO | WO 01/52379 | 7/2001 |
| WO | WO 01/69758 | 9/2001 |
| WO | WO 01/77525 | 10/2001 |

OTHER PUBLICATIONS

A. Karlis, et al., Proceedings of the Third IEEE International Conference on Electronics, vol. 2, pp. 1013–1016, "Small Power Systems Fed By Hydro, Photovoltaic, Wind Thrbines And Diesel Generators", 1996.

J. Wiik, et al., International Conference on Power System Technology, vol. 1, pp. 49–54, "Impacts From Large Scale Integration Of Wind Farms Into Weak Power Systems", 2000.

(List continued on next page.)

*Primary Examiner*—Nicholas Ponomarenko
(74) *Attorney, Agent, or Firm*—Oblon, Spivak, McClelland, Maier & Neustadt, P.C.

(57) ABSTRACT

An electric power system provides a coordinated and controlled intercommunication and operation of power engineering equipment and converters, e.g., rotating AC machines, power electronic converters and transformers as well as power grids in order to enhance electric power produced by renewable facilities. As viewed from the power grid and its stakeholders' perspective, enhanced renewable facilities are more stiff than conventional renewable facilities, and produce power that is as commercially valuable and fungible as electric power produced by traditional plants such as fossil fuel power plants, hydroelectric plants, nuclear plants and the like. xMs and SMs, or more generally yMs, fulfill the demands of stiffness and reduced variability, which have conventionally limited the commercial usefulness of a large scale use of renewables delivering power to a power grid.

56 Claims, 14 Drawing Sheets

OTHER PUBLICATIONS

Implementing Short–term Prediction at Utilities, L. Landberg et al, Final Report to the European Commission, Jan. 1996 to Dec. 1998, pp. 1–16.

Implementation to Short–Term Prediction, L. Landberg et al, 1999 European Wind Energy Conference, Mar. 1–5, 1999, pp. 57–62.

Short–Term Winding Forecast, Development and Application of a Messoscale Model, Bruce Bailey et al, 1999 European Wind Energy Conference, Mar. 1–5, 1999, pp. 1062–1065.

Investigation of the Effects of Wind Speed Forecasts and Economic Evaluation of the Increased Penetration of Wind Energy for the Island of Crete, E. Akylas et al, 1999 European Wind Energy Conference, Mar. 1–5, 1999, pp. 1074–1077.

Advanced Short–Term Forecasting of Wind Power Production, G. Kariniotakis et al, European Wind Energy Conference, Oct. 1997, pp. 751–754.

Statistical Methods for Predicting Wind Power, Torben Skov Nielsen et al, European Wind Energy Conference, Oct., 1997, pp. 755–758.

Experiences with Statistical Methods for Wind Power Prediction, T. S. Nielsen, et al, 1999 European Wind Energy Conference, Mar. 1–5, 1999, pp. 1066–1069.

Short Term Prediction of Wind Speed and Power Output of a Wind Turbine with Neural Networks, H. G. Beyer et al, 1994 European Wind Energy Association Conference and Exhibition, Oct. 10–14, 1994, pp. 349–352.

Can Wind Power Be Sold in a Deregulated Electricity Market?, Bent Sorensen et al, 1999 European Wind Energy Conference, Mar. 1–5, 1999, pp. 375–378.

Growth Potentials of Wind Power in a Liberalized Energy Market,, Dr. Ferdinand Lutz et al, 1999 European Wind Energy Conference, Mar. 1–5, 1999, pp. 508–511.

Specifications for Connecting Wind Farms to Transmission Network, Eltra, Transmission System Planning, Apr. 26, 2000, Eltra Doc. No. 74174, pp. 1–13.

* cited by examiner

SYSTEM, METHOD, ROTATING MACHINE AND COMPUTER PROGRAM PRODUCT FOR ENHANCING ELECTRIC POWER PRODUCED BY RENEWABLE FACILITIES

CROSS-REFERENCE TO RELATED PATENT APPLICATIONS

The present application contains subject matter related to that disclosed in co-pending commonly owned U.S. patent application Ser. No. 09/749,999 entitled "System, Method and Computer Program Product For Enhancing Commercial Value of Electrical Power Produced From a Renewable Energy Power Production Facility", filed Dec. 29, 2000; U.S. patent application Ser. No. 09/838,178, filed Apr. 20, 2001, entitled "System, Method and Computer Program Product For Enhancing Commercial Value of Electrical Power Produced From a Renewable Energy Power Production Facility"; U.S. patent application Ser. No. 09/839,220, filed Apr. 23, 2001 entitled "System, Method and Computer Program Product For Enhancing Commercial Value of Electrical Power Produced From a Renewable Energy Power Production Facility"; U.S. patent application Ser. No. 09/881,001 filed Jun. 15, 2001 entitled "System, Method and Computer Program Product For Enhancing Commercial Value of Electrical Power Produced From a Renewable Energy Power Production Facility;" and U.S. Provisional Patent Application Serial No. 60/298,142 filed Jun. 15, 2001 entitled "System and Method for Risk-Minimization and Mutual Insurance Relations in Meteorology Dependent Activities," the entire contents of each of which being incorporated herein by reference.

BACKGROUND OF THE INVENTION

Field of the Invention

The present invention is directed to systems, methods, rotating machines (as well as power electronic converters associated with the rotating machines) and computer program products that relate to electric power that is applied to an electric power grid after being generated from renewable power generation facilities ("renewables"). More specifically, the present invention is directed to systems, methods, rotating machines and computer program products for enhancing electric power produced by renewable facilities, such as wind turbine plants, solar electric power plants and the like, so as to make electric power generated thereby as commercially valuable and fungible as electric power produced by traditional sources, e.g., fossil fuel power plants, hydroelectric plants, nuclear plants and the like.

DISCUSSION OF THE BACKGROUND

Renewables are "natural" power production sources that instinctively should be regarded as optimal sources of energy for producing electric power. Renewables do not require burning of fossil fuels, do not result in nuclear waste by-products, do not require the channeling of water sources, and do not otherwise disturb the environment.

On the other hand, renewables are burdened by "weakness" and "variability" (each defined below), thus not offering AC power grid operators the (voltage) "stiffness" and type of planned control that the power grid operators and owners possess with conventional power generation facilities, especially during normal operation as well as during faults. The term "weakness" refers to a condition or quality of being weak. Moreover, in the context of the present document, weakness in reference to a power grid refers to (1) a risk of failure when subject to pressure, stress or strain, (2) having a lack of physical strength, energy or vigor, (3) having a lack of proper strength for resisting failure in a strained environment, (4) having a lack of ability to function normally or fully, and (5) having a lack of aptitude or skill. The term "variability" in reference to a power surge relates to (1) a quality, state or degree of being variable or changeable, (2) having characteristics that are subject to vary or have a tendency to variation, (3) have a characteristic (such as wind or currents) tending to change direction, and (4) being capricious (irregular and unpredictable).

"Stiffness," (defined below) in the context of voltage in a power grid scenario relates to (1) corresponding to an infinite bus in a power grid, (2) having a quality, state or degree of being difficult to change or disturb, (3) being firm as in purpose, or resolute, and (4) being potent or strong.

As recognized by the present inventors, the AC power grid is not yet exposed to full stress regarding the weakness associated with renewable power generation facilities. Such facilities have not reached sufficient penetration in the grid, as compared to the existing methods and mechanisms known for supporting stable power grid operation and for proper fault handling. An increase in percentage of conventional renewable facilities would tend to limit the transmission availability and capability of existing power grids. Existing methods and mechanisms for stable power grid operation and fault handling are based on the fact that the existing power plants, converting energy from the traditional sources into electrical power, possess a transient built-in overload capability, especially regarding reactive power and fault currents. Consequently, modem AC power grids exhibit voltage stiffness sufficient for normal operation. This enable the grid to be operated within a few percent voltage variation around its nominal value.

By way of background, reactive power is used to stabilize the AC power grid's operation and its voltage stiffness and thus the grid's power quality. Fault currents are considerably larger than the nominal current levels, say 3 to 10 times, which ensure proper and rapid fault handling with existing methods and mechanisms.

Modern designers of electric conversion systems embedded in renewable facilities have tried to identify ways to use the same conversion systems to provide both active and reactive power from renewable facilities with a power throughput through only one type of power converter. Some designers thus mainly focus on the reactive power issue during normal operation and the associated perpetual AC voltage control in the operative AC power grid. However, they neglect the transient fault current and the transient voltage stiffness issues, thus leaving transient needs to be solved by others, such as AC power grid owners and operators and traditional AC power plant owners. Thus, traditional renewables may be environmentally friendly, but the nature of the power they produce and the strain they place on the system is viewed as a burden on the power production system, if deployed in great numbers. When attempting to address the power quality issue, renewable designers sometimes rely on a solution that includes expensively dimensioned power semiconductor hardware when the renewable facility has the duty to support, or even maintain, the voltage stiffness and/or the supply of short circuit power during faults.

DEFINITIONS AND TECHNICAL DESCRIPTIONS

Short-circuit Power, Voltage Stiffness
Short-circuit Capacity, SCC

A product of the pre-fault bus voltage and the post-fault current is referred to as short-circuit capacity (SCC), or fault level of a bus in question. By definition it is the value $$SCC=EI=E*E/X$$

where E is bus voltage magnitude and X is reactance for the Thevenin circuit.

SCC and voltage stiffness

As E (pre-fault bus voltage, in the above equation) equals the pre-fault voltage of the shorted bus and this voltage normally has a magnitude of approximately 1 pu, (p.u.=per unit) the SCC becomes $$SCC=(approximately)1/X$$

(where X is the Thevenin reactance; same as X above)

The SCC has a direct bearing on the choice of circuit breakers, which must have an interrupt megavoltampere capacity equalling at least the fault level value for the bus in question. It should be noted that there is a direct relationship between the SCC and the 'voltage stiffness' of a system.

AC/DC System Interconnection—Short-circuit Ratio, SCR

Since the AC power grid's system strength has an important impact in the AC/DC system interconnection, it is useful to have a simple way of measuring and comparing relative strength of AC systems. The short-circuit ratio (SCR) has evolved as such a measure. It is defined as:

$$SCR=(\text{short-circuit MVA of AC system})/(\text{DC converter MW rating}).$$

The operation of a DC system when connected to a weak (low short-circuit capacity) AC system is, as an example, associated with the following problems:
(1) high dynamic over-voltages, (2) voltage instability, (3) harmonic resonance, and (4) objectionable voltage flicker.

Stability Improvement

Practically, useful methods to improve power system (transient) stability include:
Increase of system voltage;
Reduction of transfer reactance; and
Use of high-speed circuit breakers and re-closing breakers.

Rotating Machine and Power Grid Interaction

To install a rotating machine and for a rotating machine drive system to function well, it is of importance to carefully study interconnection issues with the network. Voltage levels, short-circuit levels (capacity), type of network (distribution or industry), connected phase compensation equipment, disturbances (e.g. lightning), interruption frequency, etc. are to be studied.

An issue to address when installing new process equipment in industry is how large the installed rotating machine can be chosen (installed) without negatively effecting the voltage quality, especially if it is a motor that is started frequently and thereby behaving like a short-circuited rotating machine. Since a short-circuited rotating machine will result in a voltage drop at the point of connection, as well as in the area of connection, a maximum size of a rotating machine to be connected is determined by a maximum allowable voltage drop (power quality requirement) during transients, such as when starting a rotating machine as a motor. These voltage variations can be difficult to handle for other load objects in the vicinity of the rotating machine, especially if it is a motor started frequently.

Short-circuit Limiters

The purpose of a short-circuit (fault) current limiting device is to limit both impulse and fundamental frequency fault currents. When connecting large AC machines to high-power grids, with low damping, these devices are also used to create fault current's zero-crossings to simplify the interruption of fault currents.

Short-Circuit Level Tradeoffs

When a load is connected to the bus where a fault will occur, the associated voltage drop on the bus is directly proportional to the Thévenin reactance, X. A perfectly 'voltage stiff' (or often called 'infinite') bus requires that X=0. Such a bus will have an infinite fault level. Consequently, there are conflicting requirements concerning short-circuit levels. The fault level further increases with the system voltage.

It is not only high short-circuit powers that can cause problems. Too low of a short-circuit power can be a problem for power quality (PQ). Hence, there is a conflicting situation where short-circuit powers should be kept low to avoid high short-circuit currents and associated costs, while at the same time it should be high to reduce power quality problems.

As explained in "Modem Power System Analysis" I. J. Nagrath and D. P. Kothari, Tata McGraw-Hill Publishing Company, New Delhi, 1980 (page 441), "[R]ecent trends in design of large alternators tend towards lower short-circuit ratio (SCR=1/Xd) which is achieved by reducing machine air gap with consequent savings in machine mmf, weight and cost. Reduction in the size of rotor reduces inertia constant lowering thereby the stability margin. The loss in stability margin is made up by such features as lower reactance lines, faster circuit breakers and faster excitation systems as discussed already, and faster system valving to be discussed later in this article."

U.S. Pat. No. 5,225,712, incorporated herein by reference is an example of how conventional power system designers, such as the case in windmills, focus on a normal operation reactive power issue, not a failed mode operation issue. U.S. Pat. No. 5,225,712 uses a self-commutated inverter with "active switches" to convert active power from an intermediate DC to standard frequency AC. At the same time, the inverter adds reactive power. However, as recognized by the present inventors, the number of power semiconductors for full fault current handling, and thus voltage stiffness, is a factor 10 to 30 larger than a most lean embodiment of the invention disclosed herein.

The high number of power semiconductors that implement the active switches is essentially determined by growing fault current demands from power grid operators on renewables facility owners and is identified as a problem by the present inventors. Regarding fault conditions and aiming at fault currents 3 to 10 times the nominal values, there is an almost instantaneous thermal response with a temperature rise above the design values, say 150° C., allowed in the inverter's Si-based active switches, available within the foreseeable future. SiC-based active switches allowing, say 300-500° C., are not expected to become available within a decade or so and furthermore are likely to be limited by a similar inherent instantaneous thermal response because the switches will be built with a lesser amount of active material.

So, there is a long-term cost-effectiveness problem associated with allowing fault currents 3 to 10 times the nominal current because the inverter's cost will increase by hundreds of percent to tolerate such fault currents, even if the high current level exist, only for some ten milliseconds or so.

With a growing share of renewables facilities, like wind power facilities, in the future connected to the power grid for power generation, there will thus be a problem of not only supplying reactive power during normal power grid operation, but also supplying considerable short-term overcurrents for fault handling to avoid voltage sags and to keep voltage stiffness in the power grid. This is because most existing, and especially, most commonly implemented schemes for system protection are based on fault currents considerably larger than the nominal current levels, say 3 to 10 times.

Power semiconductor converters like self-commutated inverters as well as mains- or machine-commutated converters are defective, or at least ineffectively, due to their production of harmonics and sensitivity to voltage sags as well as to unbalanced three-phase voltages in the AC power grids; all of these drawbacks can be seen as "hindering" side-effects.

To address the variability issue above, even the early pioneers of renewables like wind power attempted to identify ways to "store" wind generated electric power in times of excess, so as to later compensate for time periods when there are lulls in the wind. For example, Poul La Cour (1846–1908) from Denmark, was one of the early pioneers in wind generated electricity. Poul La Cour built the world's first electricity generating wind turbine in 1891. This design included DC generators and stored energy as hydrogen. Poul La Cour was concerned with the storage of energy because he used the electricity from his wind turbines for electrolysis in order to produce hydrogen for the gas lights in his school.

This concept of energy storage has not been abandoned and even modern inventors of wind turbine electric generation facilities are still trying to identify ways to use physical media to store the energy produced by windmills. See, e.g., U.S. Pat. No. 5,225,712, which uses fuel cells, batteries, and the like as physical media to store electrical power, and, which embodies similar self-commutated units to combine active power from both the windmill's generator-rectifier combination and the embedded fuel cells, batteries, and the like to form a power output via only one power converter from an intermediate DC link to the standard frequency AC power grid.

In the early days, wind energy plants were generally isolated from one another and provided small scale generation facilities. Through a variety of experiments, wind energy plants have generally evolved and a common theme is now to group a number of wind turbines together so as to form wind farms that can generate up to tens of megawatts via the aggregation of smaller plants that produce only slightly above one megawatt each. Most modern rotor blades on large wind turbines are made of glass fiber reinforced plastics (GRP). These wind power plants are today planned to grow slightly above 3 or 5 megawatts per unit, limited by a reliable and transportable blade size of the wind turbine, (the "propeller").

Solar electricity plants are to a growing extent based on photovoltaics, PV, where power electronic converters feed electricity from solar cells into the power grid. Another solution is based on solar heaters with boilers and turbines driving electrical power generators connected to the grid. Both solutions can be embodied with energy storage to address the variability issue. Boiler-based systems can store energy in steam or molten salt as examples. Embodied with turbo power generators, they can behave more or less like a fossil-fueled steam power plant with fairly limited problems regarding weakness, voltage stiffness and variability. PV-based systems face problems, regarding weakness, voltage stiffness and variability, which are similar to wind power plants and solutions like embedded fuel cells, batteries, and the like. PV-based systems often form a power output via only one power converter from an intermediate DC link to the standard frequency AC power grid.

Drawbacks of Wind Power Systems as an Example of Renewable Power Facilities

The invention is focused on large-scale electrical generation with electrical connections to the electrical power grid. So, the characteristics of stand-alone systems are omitted in the present discussion. Existing wind power plants are based on a continuous evolution since the 1970s with growing power ratings as well as growing numbers installed today, summing up to >4 $GW_{peak}$/year and with a growth of >35%/year. The plants are designed as small-scale units around the fact that minor energy contributions to the grid are not jeopardizing the performance of the power grid, which is to more than 90% supplied by the large-scale units based on coal, oil, gas, nuclear and hydro. The existing wind power plants and their direct power grid adaptation, i.e., their almost only mill-by-mill AC connection, are furthermore used because there have been no better alternatives. The published literature on conventional wind power systems is a catalog of patch-work measures to remedy this fatal flaw, see, e.g., Ackerman, T., et al., "Wind Energy Technology and Current Status: A Review", Renewable and Sustainable Energy Reviews 4(2000) 315–374; and Soder, L., "The Operation Valve of Wind Power in the Deregulation Swedish Market", First International Workshop on Feasibility of HVDC Transmission Networks for Offshore Wind Farms, Mar. 30–31, 2001. Also see, e.g., an interview with Eltra's CEO, Georg Styrbro in ERA (a Swedish Magazine) No. 4, 2001 (pp 40–42), roughly translated as, "If the wind becomes strong instead of light or if the expected storm arrives several hours before estimated, then we stand there with a lot of wind power, which we have not been able to sell over the power exchange earlier during the day. If the storm suddenly passes by Denmark or instead becomes a light wind, we could end up in the opposite situation. Then we might have promised away too much power. Then we must buy or sell [power] on the balance power market, and that of course becomes expensive, he says."

The following three lists include some specific examples:

For Stand-alone Windmills for Electrical Power Generation:
1) with an asynchronous machine which acts as a generator, but inherently consumes reactive power from the AC grid;
2) compensated by a fixed capacitor bank to a reasonable power factor; and 3) with a risk for so called "island operation," "magnetized" by the capacitor bank with a frequency differing with tens of Hz from the nominal value after faults;

For Wind Power Plants Erected with a Fixed Speed Adaptation Between the Wind Turbine and the Electrical Generator:
1) embodied as a mechanical gear-box to increase the speed of the generator shaft;
2) at a cost which is 3 to 5 times the cost of the generator;
3) at a large reduction of the mean time between faults, MTBF; and
4) at a large increase in the mean time to repair, MTTR;

The Power Quality Aspects at the Point of Grid Connection Have been Addressed Lately:
1) the tower shadow is a low-frequency, periodic disturbance which is a cause of "flicker," a low-frequency variation of the grid voltage causing low-frequency RMS-value variation, e.g., an inconstant or wavering light, etc.; and
2) the stochastic character of the wind energy causes also flicker, both aspects compensated by static-var-compensators, SVCs or local energy storage units;

Adjustable-speed wind power plants use the wind energy better than a constant-speed one. They include e.g., a constant DC voltage link frequency converter between a variable-frequency power generator driven by a variable-speed wind turbine and the power grid with a standard frequency AC:

1) The gear-box is kept because the asynchronous machine, i.e., the industrial work-horse normally used as a motor, can be used as the least expensive type of generator;
2) The gear-box is redundant when using multi-pole low-frequency generators necessarily designed with many poles and made with very large diameters;
3) Power quality and power factor issues are partly eliminated by inherent capabilities during steady-state operation with low fluctuations in the wind speed;
4) Energy storage devices, based on hydrogen & fuel cells or electrochemical accumulator batteries or the like with a very high cost (e.g., 3 to 10 SEK/kWh for a system with fuel cells, accumulators, etc., compared to 0.03 to 0.3 SEK/kWh for bulk power from large-scale generation based on coal, oil, gas, bio-fuel, nuclear & hydro) per kWh compared to sales price are sometimes used at the DC voltage link inside some wind energy plants to balance out power fluctuations like wind gusts;
5) Reactive power production capability towards the power grid is normally inherent in large synchronous generators and can be partly incorporated in a wind mill adjustable-speed plant, although it is heavily limited by operating close to rated current during fault conditions. In conventional systems, such as that described in U.S. Pat. No. 5,083,039 (incorporated herein by reference) and U.S. Pat. No. 5,225,712 that include pulse-width modulation (PWM) inverters, mechanisms are sought for providing reactive power to the grid. This is important because reactive power is important for operating an AC power grid.

U.S. Pat. No. 4,941,097 (incorporated herein by reference) explains that PWM converters are not encumbered by long time constants associated with speed governors and thus may be expected to surpass the performance of AC generator stations in providing dynamic enhancement in the utility system. On the other hand, the present inventors have recognized that rotating electric machines, like generators and compensators, possess an inherent overload capability, which is superior to all power electronics especially PWM insulated gate bipolar transistor (IGBT) inverters, with very limited overload capability. Furthermore, conventional power plants (coal, oil, gas, bio-fuel, nuclear and hydro) produce fault currents 5 to 10 times the nominal current, a fact on which rapid fault clearing is based in the existing protection schemes of the main AC power grid.

There are also mills with gear-boxes, wound rotor asynchronous machines and speed variation based on rotor resistance variation (see, e.g., Opti-Slip® from Vestas A/S, DK, "Semi-variable speed operation—a compromise?", described in Proceedings of 17 Annual Conference, British Wind Energy Association. Jul. 19–21, 1995, Warwick, UK) as well as on rotor converter cascades (see, e.g., PCT Publication WO99/07996), i.e., adjustable-speed systems which do not need fully rated power converters to be connected to the power grid.

Recently installed wind power plants have been erected as wind farms with several, constant-speed and/or variable-speed units connected to the same point in the electric power distribution grid, which:

1) simplifies power quality issues like the remedial use of SVCs mentioned above,
2) simplifies maintenance, and
3) simplifies operation, but has not simplified the power grid's start-up procedures, maintenance, fault handling based on large short-circuit power, etc.

Sea-based wind farms have recently been commercialized. Several of these are equipped with AC-to-AC converters inside, i.e., the land-based technology. The inherent capacitance in the power cable and its reactive power generation limits the transmission cable length at AC standard frequencies (50 or 60 Hz). DC transmission is proposed (see, e.g., PCT Publication WO97/45908, incorporated herein by reference) for cables from a wind farm to the grid.

When conventional wind power systems are connected in an AC multi-terminal configuration to the power grid, patch-work measures have had to be devised to make them have the appearance of a "negative load", more precisely a negative admittance, with proper steady-state active and reactive behavior and being "harmless" during major faults in the power grid. Finally, there is no delivery guarantee on electric energy trade of forward contracts, as an actor in the business, without adding/forcing the use of very expensive energy storage devices, based on hydrogen & fuel cells or electrochemical accumulator batteries or the like, which also must be considered as patch-work measures.

The background of the invention can be summarized by reciting some general problems, recognized by the present inventors, associated with renewables deployed on a large scale and fed into AC power grids as follows.

(a) Throughput of active power, P, is a problem from renewable energy sources like wind turbine(s) to an AC power grid. It is well-known to one skilled in the power systems art that there are mainly reactive characteristics that describe the normal operation of all AC HV & MV power grids. So, it is important to handle a suitable value of reactive power, Q, to form an AC complex power combination P+jQ to operate the power in-feed properly, either.
  (a1) with a utility-demanded power factor, or
  (a2) with a voltage control capacity.
(b) Reactive power compensation so that the power factor equals zero, during normal operation, is a utility-demand for the major part, of existing installations for voltage stiffness.
(c) Another problem is short circuit power capability during faults like short circuits and/or faults to ground. This power capability is mainly reactive and provides fault handling and voltage stiffness.
(d) Another problem is additional energy supply capability from a rotating electrical machine, preferably driven by a prime mover, P.M.,
  (d1) to supply a part of a failing energy—compared to the prognosticated and sold energy-during normal operation, and/or
  (d2) to supply energy for normally rare start-up procedures especially black-grid start.
(e) Another problem is energy storage capability to eliminate voltage flicker due to "shadows", like e.g., tower shadow and wind gusts during normal operation of wind power plants, and like e.g., shadows caused by clouds.
(f) Another problem is, later referred to as a problem of "type (f)" is energy storage capability during faults where the voltage sags and the transferable power capability from wind to grid is temporarily reduced to maybe as low values as 5 to 10% of nominal value during fault time of some 0.2 seconds (a standard power plant criterion).

(g) Right-of ways for transmission lines are not easy to achieve because the visual impact, as well as the levels of questioned, low-frequency, LF, electro-magnetic fields, EMFs, are considerable from three-phase AC overhead lines.

Problems (a), (b) & (e) are fairly well known demands and problems, while problems (c), (d) & (f) have been recognized by the present inventors as being market hindrances for renewable facilities. Problems (c), (d) & (f) will primarily arise due to the increased power ratings—of both single facilities, like wind mills and wind parks as well as solar electric power generation plants—emanating from recent R&D steps in renewables power generation. Problems (c), (d) & (f) will secondarily arise due to the increased number of installations, too.

Techniques to solve problem (d1) will likely be limited in use to fairly small energy amounts on a yearly base due to the availability of virtual energy storage, to prime power from renewables, as discussed in U.S. patent application Ser. No. 09/749,999 into premier power, i.e., to overcome the main problem of "variability". To solve problem (d2) a similar source of energy is needed to supply energy for start-up procedures, especially for start-up on black grids.

Problems of type (f) have hitherto been solved by tripping a connectivity to the renewable power plants but can, as presently recognized, be solved by using the physical arrangements—wind turbines, rotating electrical machines, power electronic converters, etc. —twice, first for power conversion and second for energy storage during 0.02 to about 2 seconds.

An Overview of Rotating AC Machines

Types of Conventional Rotating AC Machines:

Synchronous machines, SM, can generate and consume reactive power as well as active power, whereby they are called upon to be operated as generators or motors, depending on their production or consumption of active power. SMs also have an imbedded capability to store energy in their moment of inertia, J, often associated with the technical term inertia constant, H. It is known to one skilled in the power generation art that SMs follow a so-called swing equation.

Synchronous compensators (condensers) (i.e., a special type of machine in the family of synchronous machines, SM) do not generate active power, but only absorb or generate reactive power to control the voltage magnitude in the power system. Synchronous condensers can also store energy in their moment of inertia, J, often associated with the technical term "inertia constant," H. It is known that for synchronous compensators the swing equation's $P_{mech}=0$.

Asynchronous machines, AM, can generate and consume active power, but consume only reactive power, and are called to be operated as generators or motors depending on their production or consumption of active power. An AM also stores energy in its moment of inertia, J, often associated with a technical term "start-up time constant", but an AM is loosely connected to the grid frequency due to the asynchronous principle.

As discussed in WO 00/67363, the contents of which being incorporated herein by reference, there is a new type of rotating AC machine. The present inventors have recognized that when used with an intelligent controller, this new type of rotating AC machine enables renewable-based power production facilities to make the power from which as fungible and desirable as power produced from conventional power production facilities, without being a detriment from a grid operator's perspective.

As will be discussed in more detail with regard to the detailed description of the present invention, this rotating AC machine is coupled in various ways to an intelligent coactive converter's output line. The machine itself is a constant frequency output rotating AC machine, xM, with variable speed. It mainly acts as a reactive compensator for "stiffness" and an active compensator for reduced "variability" 1) based on the moment of inertia in the rotating parts and 2) optionally based on a prime mover, P.M. The present invention fully leverages these attributes to enable renewable facilities to reliably deliver power to the power grid and to avoid stiffness and variability issues typically associated with renewable-based power production facilities.

"yM" is the nomenclature given to constant-frequency output, rotating AC machines optionally used in embodiments of the present invention:

yMs comprise xMs, with a variable/varying speed capability, and SMs, with constant speed capability, coupled in various ways to an intelligent coactive converter's output line, as will be discussed, and acting as a reactive compensator for "stiffness" and an active compensator for reduced "variability" 1) based on the moment of inertia in the rotating parts and 2) optionally based on a prime mover, P.M.

Several types of variable or constant speed, rotating AC machines are furthermore used as various alternatives in different embodiments of the present invention:

SM, AM or xM are types of rotating electrical AC machines that are mechanically coupled to the wind turbines (or other renewable power generation facilities) and mainly driven as generators by the wind turbines. They can be idling or motoring during transient conditions like faults or start-up procedures.

The following is a further description of some differences between an xM and an SM. An SM has, under stationary operational conditions, a fixed relation between the mechanical rotational speed and the output frequency of the rotating AC machine, while this is not the case for an xM. The SM can hence be described as a constant speed rotating AC machine, while xM can be described as a rotating AC machine with variable/varying speed capability, where the mechanical speeds of the AC machines are related to the AC network frequency.

Sources and Sinks of Active Power and Interaction with Sources and Sinks of Reactive Power It is helpful to focus on sources and sinks of reactive power when studying the voltage levels in an AC power grid. It is known that voltage levels in an AC power grid are closely related to absorption or injection of reactive power. The control of the AC power grid's voltage is in fact closely related to the control of reactive power. An injection of reactive power at a bus in the AC power grid will generally increase the voltage in the nearby surrounding grid.

The traditional most influential sources and sinks of reactive power in power systems include the following:

Overhead AC lines generate reactive power under light load since their production due to the line capacitance exceeds the reactive losses in the line. Lines absorb more reactive power than they produce under heavy load.

Underground AC Cables produce reactive power since because of their high capacitance, the reactive losses never exceed the production, under normal operating conditions. This, in turn, limits the length of the transmission cable for standard frequency AC and favors of DC or LF AC.

Transformers absorb reactive power because of the reactive losses.

Shunt capacitors generate reactive power.

Shunt reactors absorb reactive power.

Synchronous compensators (condensers) and static VAr compensators can absorb or generate reactive power depending on the need of the surrounding part of the power grid, i.e., in a regional part of a T&D grid where reactive power is distributed and collected (intentionally allocated), without any major drawbacks regarding voltage levels and power quality.

Series capacitors are connected in series in highly loaded lines and thereby increase their production of reactive power.

Loads seen from the transmission system are usually inductive. So, they absorb reactive power.

Synchronous machines, SM, can generate and consume reactive power as well as active power, whereby they are called upon to be operated as generators or motors depending on their production or consumption of active power.

These devices form control measures which are generally classified as either static or dynamic. Static components such as shunt capacitors and reactors can be regulated in fixed discrete steps and with some time-delay and therefore cannot be used to improve system response to fast phenomena related to transient dynamics in power systems. They are, however, very reliable and a cost-effective way of reactive compensation for steady-state optimization as long as they are installed in moderate amounts.

On the other hand, dynamic compensation devices such as static VAr compensators, synchronous condensers and generators are more expensive, but can be controlled continuously and be used to improve transient response of the power system because of their short response time. Dynamic compensation is however more expensive per MVAr of compensation. Often, reactive demand from loads close to generation areas is supplied by generators and by the cheaper static devices such as shunt capacitor banks and reactors in load areas far from generators. It is however, not unusual to install capacitor banks in combination with dynamic devices to increase the control range of these devices. OLTC, On-Load Tap Changers, on power transformers are very cost-efficient tools for voltage control.

Reactive power compensators were, in earlier days, mainly based on the above-mentioned synchronous machines. They are fundamental as actuators for a stable operation of power systems. More recently, compensation is often provided by thyristor-controlled capacitors. SVC is an acronym for Static Var Compensators used during approximately 20 years in the transmission area. Another device is the Advanced Static Var Compensator, earlier often shortened as AdvSVC, but also called STATCON, and more recently standardized by CIGRÉ/IEEE to STATCOM an acronym for Static (Synchronous) Compensator.

AC power flow in the AC power grids is, in modern electrical power engineering, closely connected to HVDC, High Voltage transmission DC links, and to R&D on FACTS, Flexible AC Transmission System, an acronym and a family name for several thyristor-based devices. FACTS includes at least:

STATCOM Static Synchronous Compensator (=AdvSVC, Advanced Static VAr compensator)

TCSC Thyristor Controlled Series Capacitor

TCPAR Thyristor Controlled Phase-Angle Regulator

UPFC Unified Power Flow Controller

MPTC Multi-level Power Transfer Controller

SVS Synchronous Voltage Source

SSSC Static Synchronous Series Compensator

TCPST Thyristor Controlled Phase Shifting Transformer

PST Phase Shifting Transformer (strictly written, PST is a competitor to FACTS).

The Unified Power Flow Controller, UPFC, consists in principle of a Static Synchronous Compensator, STATCOM, as the shunt element combined with a Static Synchronous Series Compensator, SSSC.

The Power Flow Controller (which includes a shunt xM, or SM and a series xM or SM) depicted inside the coactive converter, FIG. 4, for example, is a competitor to UPFC and preferably embodied with two cable-based rotating machines as described in PCT Publication WO 99/29008, entitled POWER FLOW CONTROL, incorporated herein by reference, as a shunt machine and a series machine. When implemented, this would become another example of a type of FACTS device.

When improving the performance of an AC power grid for renewables, it is necessary to deal not only with sources and sinks of reactive power, HVDC and FACTS, but also with sources and sinks of active power and their interaction with sources and sinks of reactive power. A similar list of traditional sources and sinks of active power could be compiled. It is thereby only necessary to deal with those sources and sinks that are important to electric power that is applied to an electric grid after being generated from renewables in order to make that electric power as commercially valuable and fungible as electric power produced by traditional sources and sold on a power exchange. The list of sources and sinks of active power and their interaction with sources and sinks of reactive power associated to renewables is thus limited to the following:

Synchronous machines, SM, can generate and consume reactive power as well as active power, whereby they are called to be operating as generators or motors depending on their production or consumption of active power. SM also stores energy in their moment of inertia, J, often associated with the technical term inertia constant, H. H in the range of 3 to 5 seconds means that the stored energy is equivalent to nominal power during 3–5 s. The so-called swing equation discussed below, describes the pendulum mode interactions between the power grid and synchronous electrical machines.

The swing equation for a single generator can be written as:

$$\frac{2H}{\omega_0} \frac{d^2\delta}{dt^2} = P_{mech} - P_{e,max} \sin\delta$$

where $P_{mech}$ is mechanical input (in p.u.; per unit)

$P_{e,max}$ is maximum electrical output (in p.u.)

H is inertia constant for generator (in MWs/MVA) defined as $H=0.5 \cdot J \cdot (\omega/p)^2 / (S_{base})$ (all in S.I.)

$\delta$ is rotor angle (in electrical radians)

t is time (in seconds)

The electrical power output from the electrical machine to the power system can, based on the above swing equation, be written as:

$$P_e = \frac{EV}{X_T}\sin\delta = P_{e,\max}\sin\delta$$

with emf E, rotor (load) angle δ as the angle between the bus voltage V and the voltage behind the synchronous reactance E, the reactance $X_T$ as the sum of the reactances of the transient reactance of the generator and the reactance of the transmission line, and bus voltage V at the far end of the line, i.e., $$X_T = X'_d + X_l$$

and the maximum electrical output is:

$$P_{e,\max} = \frac{EV}{X_T}$$

- Although not a direct source or sink of active power, synchronous compensators (condensers) (i.e., a special type of the family of synchronous machines, SM) can not only absorb or generate reactive power but also store energy in their moment of inertia, J, often associated with the technical term inertia constant, H and thus are a source of kinetic energy. This kinetic energy may thus be harnessed to be used as a source or sink for generating/sinking active power. It is known that for synchronous compensators the swing equation's $P_{mech}=0$.
- Asynchronous machines, AM, can generate and consume active power but consume only reactive power, and are called to be operating as generators or motors depending on their production or consumption of active power. AMs also store energy in their moment of inertia, J, often associated with a technical term "start-up time constant", but is loosely connected to the grid frequency due to the asynchronous principle.
- STATCOM (AdvSVC) is sometimes embodied with a DC power source, e.g., a fuel-cell, a prime mover, or, quite simply, an accumulator (a battery) on its DC-link. STATCOM alone has very limited energy stored in its DC-side capacitor compared to synchronous machines.
- Power electronic converters based on IGBTs, GTOs, SCRs and the like, operating in inverting or rectifying mode. Those converters that are mains-commutated or machine-commutated (embodied with SCRs) are characterized by a, more or less, closed relation between active and reactive power while those that are self-commutated (embodied with IGBTs or GTOs) provide a large freedom regarding active and reactive power. Power electronic converters transfer more or less the electrical power immediately from its input to its output. They provide voltage transformation so that AC and DC quantities are to some extent interlaced but those converters that are based on IGBTs and GTOs provide a large freedom regarding transformation ratios and especially dynamics of the voltages' magnitudes and phase angles.

As recognized by the present inventors, both rotating machines and power electronic converters are examples of sources and sinks that are important to electric power that is applied to an electric grid after being generated from renewables in order to make that electric power as commercially valuable and fungible as electric power produced by traditional sources sold on a power exchange.

In conclusion, regarding the background art, it is fitting to say that renewable power plants are today burdened by "weakness" & "variability". Therefore, they do not offer power grid operators the voltage stiffness, fault handling and type of planned control that the power grid operators and owners are furnished with by those owning and operating traditional power plants, which for decades have produced commercially fungible and reliable power during normal operation as well as during faults.

On the other hand, renewables like wind power and solar electric power, are generally well recognized as environmentally friendly types of power, but not as commercially valuable or fungible as other types of electricity such as that generated by traditional sources like fossil fuel power plants, hydroelectric plants and nuclear plants.

SUMMARY OF THE INVENTION

The present description of the invention is not intended to be limited to the discussion in the following few paragraphs in this section, but rather is a synopsis of selected facets of the present invention. A more complete understanding of the present invention will be obtained in view of the teachings throughout this document. Nevertheless, an object of the present invention is to address the above-identified and other shortcomings of conventional systems and apparatuses using renewable technology.

Widespread Use of Renewables Gives Rise to Need for Converters

Traditional rotating AC machines, like synchronous machines, SM, and their traditional control systems, used for power plant facilities with traditional energy sources, provide stiffness and planned control, but are not sufficient when renewable facilities are employed on a large scale in the AC power grid. The other traditional rotating AC machines, asynchronous machines, AM are mainly used as motors, but from a cost point-of-view are used as generators coupled to e.g., wind turbines.

Renewable facilities are burdened by "weakness" and "variability", thus not offering AC power grid operators the (voltage) stiffness and type of planned control that the power grid operators and owners possess with those who have produced commercially reliable power for decades during normal operation as well as during faults. These burdens result in new demands for rotating AC machines and their control systems to enhance electric power produced by renewable facilities, like wind turbine plants, solar electric power plants and the like, so as to make that electric power as commercially valuable and fungible as electric power produced by traditional sources, e.g., fossil fuel power plants, hydroelectric plants, nuclear plants and the like. The demands are:

- reactive and/or active power control
- adding/subtracting active power, such as with a prime mover, moment-of-inertia, and virtual energy storage
- adding/subtracting reactive power
- electromechanical conversion
- power electronic conversion (e.g., SCR, IGBT, GTO)
- reducing the low order harmonics pollution from the power electronic conversion
- symmetrizing the power grid
- supplying short-circuit power during faults
- start-up of the power grid after major faults
- sometimes frequency conversion These demands can be summarized as demands to "prime" power from renewable facilities.

A new class of converter according to the present invention includes controllable/coordinatable, constant/variable-frequency output, converters that include traditional and innovative combinations of:

1. electromagnetic, electromechanical converters (i.e., rotating machines) configured for electromechanical conversion;
2. power electronic converters for reactive and/or active power control, sometimes including frequency conversion;
3. at least one digital processor with a computer program product and communication and control mechanism; and
4. inputs from and outputs to other digital processors with computer program products and mechanisms for communication and control.

The two first demands are fulfilled regarding rotating AC machines, to a higher degree by the constant-frequency output, variable/variably speed rotating AC machine, (xM), but to a lower degree by the traditional synchronous machines, SM, which are operating with constant-frequency output, constant speed.

One inventive aspect of the present invention is a coordinated and controlled intercommunication and operation of power engineering equipment and converters, e.g., rotating AC machines, power electronic converters and transformers as well as power grids in order to enhance electric power produced by renewable facilities. As viewed from outside the present invention, i.e., viewed from the power grid and its stakeholders' perspective, renewable facilities are seen as stiff and produce power that is as commercially valuable and fungible as electric power produced by traditional plants such as fossil fuel power plants, hydroelectric plants, nuclear plants and the like. xMs and SMs fulfill the demands, when properly employed, which the present inventors recognize can be accomplished with the coordination of system assets in a continuing, or at least periodic, manner.

An intelligent coactive converter is connected to a standard frequency AC power grid and enhances electric power produced by a renewable facility. A constant-frequency output, rotating AC machine, a digital processor with a computer program product and, mechanism for communication and control (together forming a controller) are included in the intelligent coactive converter. The digital processor and the computer program product control, via the communication mechanism, primarily the constant-frequency output, rotating AC machine and a number of rotating AC machines in the renewable facility, to prime, regarding voltage stiffness and power variability, the electric power produced by the at least one renewable facility when feeding the power to the standard frequency AC power grid.

Renewables, when comprising a large percentage (e.g., 20% or more of power generation sources) cannot be allowed to be the cause of a devastating deficit of power production delivered to a power grid. Electric power from renewables when used in a large scale, needs to be as commercially valuable and fungible as electric power produced by traditional sources sold on a power exchange under at least the following conditions:

The coldest day in Denmark is strongly associated with a peak load within the Danish Eltra Grid.

The Grid's connections to the surrounding Grids are then often stressed to their limits.

Conventional (security assessment) criteria like N-1 and N-2 security constraints (contingencies) are necessary to analyze bottlenecks and similar constraints.

Voltage stiffness in the AC power grid's nodes is critical.

Similar deficits appear in other grids like those in the US, e.g., the grid in California most likely on the hottest day, in which there is a peak load.

One object of the present invention is to provide systems, methods, rotating machines, and computer program product that convert electrical power generated from renewables like wind power, solar electric power, and the like, into premier power, i.e., as commercially valuable or fungible as traditional types of electricity.

Another object of the invention is to overcome the "weakness" & "variability" that are associated with renewables. Weakness and variability hinder AC power grids' system operators from possessing the voltage stiffness and the type of planned control that they and power grid equipment owners enjoy from those who have for more than a century commercially and reliably produced power using non-renewable sources. With renewables, there is variability during normal operation and there is weakness during faults where the level of short circuit power and its distribution is important for the voltage stiffness.

Another object of the invention is to use the system hardware and software resources for more than one task, for best cost-effectiveness.

An example of this is to use the moment of inertia normally inherent in the wind turbines and the rotating electrical machines to reduce the influence from weakness and variability.

Another example is to use the current overload capabilities inherent in the rotating electrical machines to provide short-term short circuit power, by using the inherent adiabatic character of windings' copper temperature rise, to provide fault handling, system protection and voltage stiffness.

Still another example is then to use the rotating shaft of xMs or SMs to assure deliveries of sold energy in case of lack of transmission capability by clutching prime movers.

In one embodiment, an xM machine is employed as part of "a coactive converter" to ensure that steady, fixed frequency power is reliably applied to the power grid, thus eliminating problems with weakness, voltage stiffness and variability. In selected embodiments, the invention uses a prime mover, P.M., as an active power source to reduce and/or eliminate the variability drawback when enhancing electric power produced by renewable facilities so as to make that electric power as commercially valuable and fungible as electric power produced by traditional sources.

Embodiments according to the present invention include always independent of xM or SM, a computer and a computer program product which perpetually models and controls the actual converters' operational status, such as:
1. air-gap-flux $\overline{\Phi}_S$, stator currents $\overline{I}_S$, rotor currents $\overline{I}_R$, load angle $\delta$, power factor $\cos\phi$ and the like in the actual rotating machines,
2. firing angles $\alpha$, respect angles $\gamma$ and the like in the actual power electronic converters,
3. as well as voltage control and similar features associated with reactive power, and
4. the active power balance and inherent—by computers controllable—torque relations to create and keep reasonably small margins for best cost-effectiveness and best availability.

The T&D capacity to incorporate renewables' power and transfer all types of active power can be assured by keeping the voltage stiffness, i.e., a grid voltage control via a proper (re)active power distribution. Renewables in the Eltra Grid, for instance, e.g., can therefore be primed (via virtual energy storage) with hydro power from Norway and/or Sweden and with distributed/decentralized prime movers (P.M.+xM or P.M.+SM) and other sources.

It is another object to reuse system resources for more than one task, i.e., to use "two-in-one", for best cost-effectiveness, e.g., to utilize inherent moment of inertia, inherent current overload capability, etc., as solutions that serve, for a limited time period at each fault or at repetitive stress occasion.

These solutions are proposed to ensure continuous operation of the renewables plants as well as traditional sources, e.g., fossil fuel power plants, hydroelectric plants, nuclear plants and the like, i.e., to overcome risks for devastating disturbances and/or power imbalance.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 4 shows a block diagram of another embodiment of the present invention where all frequency conversion is to a standard frequency AC located close to the primary sources. Sources of power can be any combination of renewables, like wind turbine plants, solar electric power plants and the like;

DETAILED DESCRIPTION OF THE PREFERRED EMBODIMENTS

Figure 1:
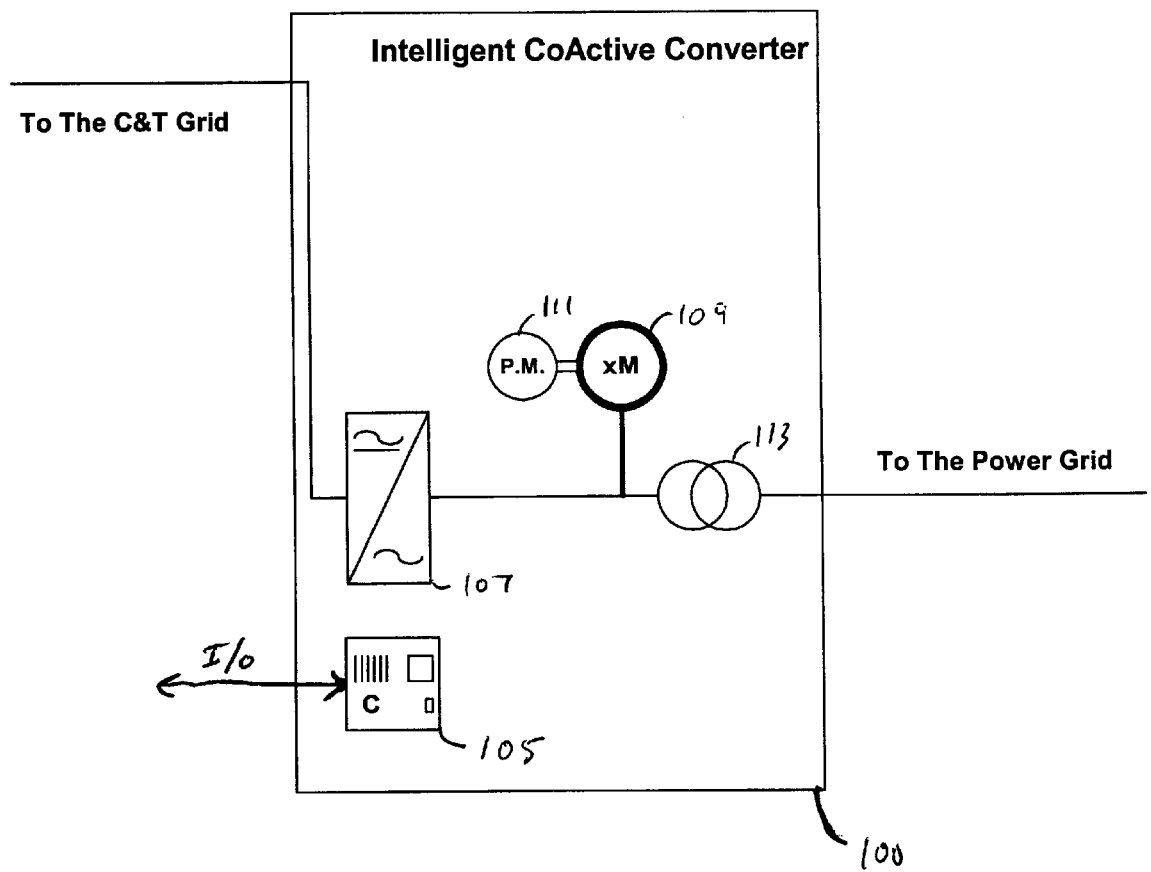
FIG. 1 is a block diagram showing the components of an intelligent CoActive Converter according to the present invention.

Referring now to the drawings, wherein like reference numerals designate identical or corresponding parts throughout the several views, FIG. 1 is a block diagram showing the intelligent coactive converter 100, located between two sets of terminals denoted "To the C&T Grid" and "To the Power Grid". Components of the intelligent coactive converter 100 include a frequency converter 107 that receives a DC or non-standard AC or variable AC input from a collection and transmission grid. The output of the frequency converter 107 is a standard AC frequency that is provided to a transformer 113 configured to match the output level from the intelligent coactive converter to the power grid. An xM 109 is connected as shown with an optional prime mover 111, for driving the rotating machine xM 109 when other generated power is not available (described below in more detail). A controller 105 is a computer-based processor including a processor, memory, I/O, and bus that interconnects the subcomponents such that computer readable instructions may be executed by the processor to implement the control processors according to the present invention. Together the xM 109 and an interface to a controller 105 form one type of "yM," which is nomenclature adopted herein to refer to a constant-frequency output rotating AC machine an operational status of which is controlled by the controller 105.: yM's include xMs, with a variable speed capability, or SMs, with constant speed capability, coupled in various ways to an intelligent coactive converter's output line, as well as for control purposes to the controller 105. While xM 109 is shown in FIG. 1, it should be noted that the xM 109 is but one embodiment of a yM, any variant of which may be used as an alternate to xM 109.

One facet of the responsibilities of the controller 105 is to provide an input/output (I/O) connection to outside sources to which the intelligent coactive converter may interact. One such device is a virtual energy storage facility, which may produce or withhold from producing, additional power to the power grid, so that power output between the intelligent coactive converter and the virtual energy storage device may be held at predetermined levels. Furthermore, the controller 105 may interact with meteorological data sources and services, hydroelectric plants, power exchanges and the like, as described in reference to FIG. 5 in U.S. patent application Ser. No. 09/749,999, cited above. Furthermore, the structure of the controller 105 may be like that shown in FIG. 11 of U.S. patent application Ser. No. 09/749,999, cited above. The intelligent coactive converter 100 holds at least one static or rotating converter from the following list:

1) A frequency converter from DC to standard frequency (fixed 50 or 60 Hz) AC;
2) A frequency converter from variable low-frequency AC to standard frequency (fixed 50 or 60 Hz) AC;
3) A frequency converter from constant low-frequency AC to standard frequency (fixed 50 or 60 Hz) AC;

4) A rotating converter supplying reactive and/or active power to standard frequency (fixed 50 or 60 Hz) AC; and
5) A power transformer for voltage adaptation and for adjusting the short circuit level.

The frequency converter is preferably a static one, but could very well be a rotating one such as a back-to-back machine, but with improved high-voltage windings as described in PCT International Publication No. WO 97/45919, and control features as described in PCT International Publication No. WO 00/67363 and PCT International Publication No. WO 00/67355, the entire contents of each of which being incorporated herein by reference.

The rotating converter xM 109 is preferably a rotating electrical machine mainly acting as a reactive compensator and an active compensator based on the moment of inertia in the rotating parts. The rotating electric machine may be of the type as described in PCT International Publication No. WO 00/67363 or PCT International Publication No. WO 00/67355 or WO 99/29008, the entire contents of which being incorporated herein by reference. The rotating converter optionally is configured to act as an electrical generator driven by a prime mover, P.M. 111, with at least one duty from the following list:

a) start-up of the power grid after major faults;
b) partly or wholly adding active electrical power, i.e., priming the wind power;
c) partly or wholly supplying reactive power to the AC power grid and optionally to the frequency converter, i.e., an important feature to prime the wind power;
d) reducing the low order harmonics pollution from the frequency converter;
e) providing active AC voltage support (J/H & $S_k$) for the operation of frequency converter;
f) releasing the frequency converter's active and reactive dependence from each other;
   e.g., stationary, when based on thyristor valves, or, during fault, based on transistor valves;
g) symmetrizing the power grid at the AC terminals of the intelligent coactive converter 100; and
h) supplying short-circuit power during faults.

Traditional HVDC transmission systems have AC terminals that are sometimes embodied with rotating machines like normal synchronous machines SM with DC rotor currents for power factor compensation as well as to provide short circuit power and voltage stiffness. Contrary to conventional systems, the present invention includes an integrated computer and computer program product that models and controls the SM's and the HVDC (power electronic) converter's operational status together.

A computer and computer program product hosted in the controller 105 contemporaneously controls the status of the xM 109 and the operation of the power electronic converter 107. There is an advantage in that the xM 109 continuously provides basic reactive power. The xM 109 is used to offset the self-commutated (IGBT-embodied) power electronic converter's reactive power production for best dynamics to stiffen the voltage in the standard frequency AC power grid. The xM 109 also reduces the rating requirements for power electronic converter 107. By the way, the term "power electronic converter" includes power circuits control circuits, processors, computer-program product, intercircuit communications, etc., while "power semiconductor converters" generally meters to actual power circuits.

The present invention uses in a preferred embodiment novel AC machines, denoted herein as xM, with multi-phase AC rotor currents in multi-phase rotor windings in accordance with PCT-applications:

WO 00/67363, A CONSTANT-FREQUENCY MACHINE WITH A VARYING/VARIABLE SPEED (xM);
WO 00/67355, POWER CONVERTER WITH ROTATING/STATIONARY COMMUNICATION/PROCESSING MEANS; and
WO 00/67358, ROTATING POWER SYSTEM STABILIZER, the entire contents of each of which being incorporated herein by reference.

Features and Characteristics of xMs Applicable to the Present Invention

A standard frequency AC constant-frequency machine xM with a varying/variable speed is a fairly stiff voltage source that can provide short circuit power to stabilize the power grid to which is connected.

It can store energy in its moment of inertia and its rotor speed (in radians/sec), following thereby a torque or power equation, e.g., $$P_{P.M.} - P_{eld\_xM} = J_{xM+P.M.} \cdot \Omega_{xM+P.M.} \cdot \frac{d\Omega_{xM+P.M.}}{dt}$$

where $P_{eld\_xM}$ is the power from the coactive converter's xM, $P_{P.M.}$ is the power from the prime mover, $J_{xM+PM}$ is a combined xM and PM moment of inertia, $\Omega_{xM+P.M.}$ is a combined rotation speed of xM and P.M.

In its most traditional embodiment, it is a static Scherbius drive, but when embodied this way has a set of slip rings and brushes with needs for regular maintenance.

In a series of recent inventive improvements, it is a brushless machine, features of which include a power semiconductor converter arranged as an AC-to-AC converter connected between a reliable embedded multi-phase voltage supply and a multi-phase rotor winding.

It provides voltage stiffness and short circuit power to the standard frequency AC power grid at a short electrical distance from its point-of-connection.

It provides negligible variability in the active power fed in to the standard frequency AC power grid and eliminates the (active power) variability in the electric power produced, e.g., by sources like renewable facilities, in its area-of-connection.

Both the traditional synchronous machine SM and the constant-frequency machine xM with a varying/variable speed are superior to capacitors regarding reactive power production. They produce reactive power even if the voltages in the power grid are lowered, e.g., during fault condition, as long as their shafts rotate, contrary to the capacitor.

The controller 105 is a local computing and control mechanism that includes a communication interface to a power exchange as well as to system operators and the like. It further includes a modeling and controlling mechanism (stored as computer readable instructions) for the xM 109, the power semiconductor converter 107, the prime mover P.M. 111, the AC power grid, etc. partly described above.

Attributes and Characteristics of a CoActive Converter Controller

The controller 105 includes a digital processor equipped with a computer program product and, communication and control mechanisms. The controller perpetually models and controls the actual converters' operational status:

1. air-gap-flux $\overline{\Phi}\delta$, stator currents $\overline{I}_S$, rotor currents $\overline{I}_R$, load angle $\delta$, power factor $\cos \phi$ and the like in the actual rotating machines;
2. firing angles $\alpha$, respect angles $\gamma$ and the like in the actual power electronic converters;

3. voltage control and similar features associated with reactive power; and
4. the active power balance and inherent torque relations (computer controlled) create and keep reasonably small margins for best cost-effectiveness and best availability.

The controller 105 controls:

1) the air-gap flux $\overline{\Phi}_{\delta\_k}$ and the stator current $\overline{I}_{S\_k}$ in wind turbine No. k, to provide reactive and active power as $$Q_{eld\_gen\_k} = Im\ \{3j\omega_k \cdot \overline{\Phi}_{\delta\_k} \cdot \overline{I}^*_{S\_k}\}\ P_{eld\_gen\_k} = Re\ \{3j\omega_k \cdot \overline{\Phi}_{\delta\_k} \cdot \overline{I}^*_{S\_k}\}$$

with variable frequency AC ($\omega_k$) from/to the generator driven by the at least one wind turbine No. k (FIG. 2) thereby utilizing the variable wind turbine speed and its associated stored energy to reduce the variability in the electric power produced by a renewable facility;

2) the air-gap flux $\overline{\Phi}_{xM}$ and the stator current $\overline{I}_{S\_xM}$ in the constant-frequency output, rotating AC machine, xM (or SM), to provide reactive and active power as $$Q_{eld\_xM} Im\ \{3j\omega \cdot \overline{\Phi}_{\delta\_xM} \cdot \overline{I}^*_{S\_xM}\}\ P_{eld\_xM} = Re\ \{3j\omega \cdot \overline{\Phi}_{\delta\_xM} \cdot \overline{I}^*_{S\_xM}\}$$

with standard frequency AC from the rotating AC machine and its inherent moment of inertia and from its optional prime mover to the AC power grid; and 3) via its mechanism for communication, enhances electric power produced by a renewable facility to reduce the burden of "weakness" & "variability", and offer AC power grid operators the (voltage) stiffness and type of planned control that the power grid operators and owners possess from traditional sources, e.g., fossil fuel power plants, hydroelectric plants, nuclear plants and the like, which are producing commercially reliable power since decades during normal operation as well as during faults.

The prime mover, P.M. 111, enables a power priming function in parallel to the priming mechanism using virtual energy storage described in U.S. patent application Ser. No. 09/749,999. This facilitates a secured operation during those peak load periods when there is a stressed transmission capacity in the AC power grid; a fact that is anticipated to appear on the transmission lines some days per year, e.g., between Sweden and Denmark as an example during peak load daytime in the extreme winter period. Similar stresses are anticipated for California and its transmission links during peak load, e.g., daytime in the extreme summer period.

The prime mover, P.M. 111, can be driven by compressed air, vegetable oil and the like in order to remain an environmentally friendly source for wind power plants, whereby the xM 109 (404 and 406 in FIG. 4), can provide more energy to "the power grid" than with inherent moment of inertia $J_{xM}$ only.

Similar priming procedures can be performed on other renewables, preferably solar electric power where hydro might be accompanied or substituted by gases that hold energy. Those gases might not be a simple source, such as air which is compressed, so-called CAES, but also a more complicated source like hydrogen which is produced by hydrolysis from temporarily available surplus electrical power and which is burned in a gas turbine used as a P.M., or like biomass, all to stay within the "renewables" category of power generation.

LNG, liquid natural gas, is a strategic option to complement or supplement "renewables" but still with fairly low environmental impact due to its low carbon content, or more precise low weight $CO_2$ per kWh. This choice is convenient if there are only rare occasions, "a few days per year" as mentioned above, when this "last resource" to produce electric power is used.

Features and Characteristics of Power Transformers Applicable in the Present Invention A power transformer (113 FIG. 1) is a piece of power engineering equipment which generally has the following attributes:

works as a voltage gear, "a voltage adapter", between two AC voltage levels, stepping up or stepping down in voltage level, like a mechanical gear;

is capable of transmitting a reasonable amount of throughput power;

provides a galvanic isolation between primary and secondary windings;

is adapted by the designer to determine, normally limit, fault currents; and lets normal loading currents through with reasonable variation in voltage amplitude and a reasonable phase shift regarding AC quantities, as well as exhibits low active losses.

A power transformer may be equipped with a controllable tap changer, on-line or off-line, for minor adjustments of its voltage ratio. It might be configured to change phase-angles as well as the number of phases, e.g., from standard 3-phase to two sets of 3-phase with 30 degrees phase shift, also called 2*3-phase, suitable for power semiconductor converters with lower harmonic stress on the power grid. A power transformer is usually used between large rotating electrical machines like a power generator and a standard frequency AC power grid. Recent development, e.g., like that described in PCT Patent Publication WO 97/45919, incorporated herein by reference, allows transformer-less connections. Another feature regarding power transformers described in PCT Patent Publication WO 97/45847, incorporated herein by reference, describes that power transformers can be embodied with a cable-based insulation system like large rotating electrical machines according to WO 97/45919. This allows for, up until now, undreamed-of possibilities regarding cost-effective short-circuit reactance values for power transformers as well as an improved ability to withstand transient short-circuit forces on the windings.

Figure 2:
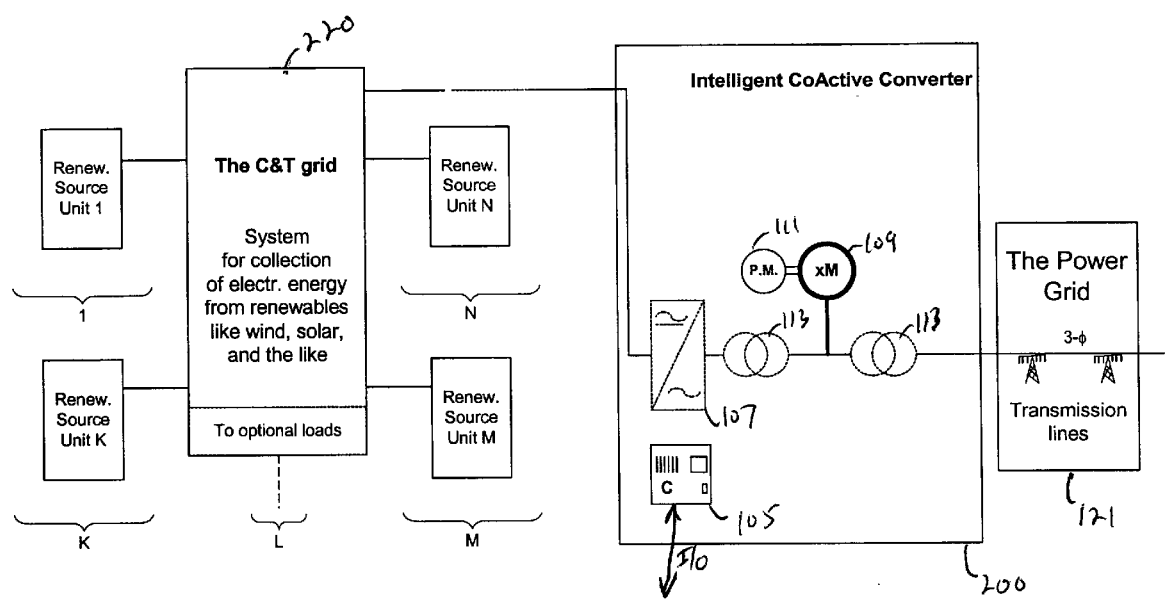
FIG. 2 is a system level block diagram which includes an embodiment of the intelligent CoActive Converter.

FIG. 2 is a block diagram showing a system that includes an intelligent coactive converter 200. As was the case with FIG. 1, the xM 109 is a specific embodiment of a yM device. Thus, any variant of the yM devices may be used as a replacement for xM 109. Many features of FIG. 2 are similar to FIG. 1, although the coactive converter 200 in FIG. 2 is configured as a substation with a prime mover 111 driving the xM 109 with optional converter 107, and transformers 113 (shown as two transformers although one or none may be used as well). Furthermore, the structure of a collection transmission grid 220 is shown to include a plurality of different renewable power generation facilities 1, N, K, and M. The collection and transmission grid collects electrical energy from the different renewable facilities, where the different renewable facilities may include wind turbine facilities, solar facilities and the like. Furthermore, the collection and transmission grid 200 may have connections thereto to optional loads L.

Figure 3:
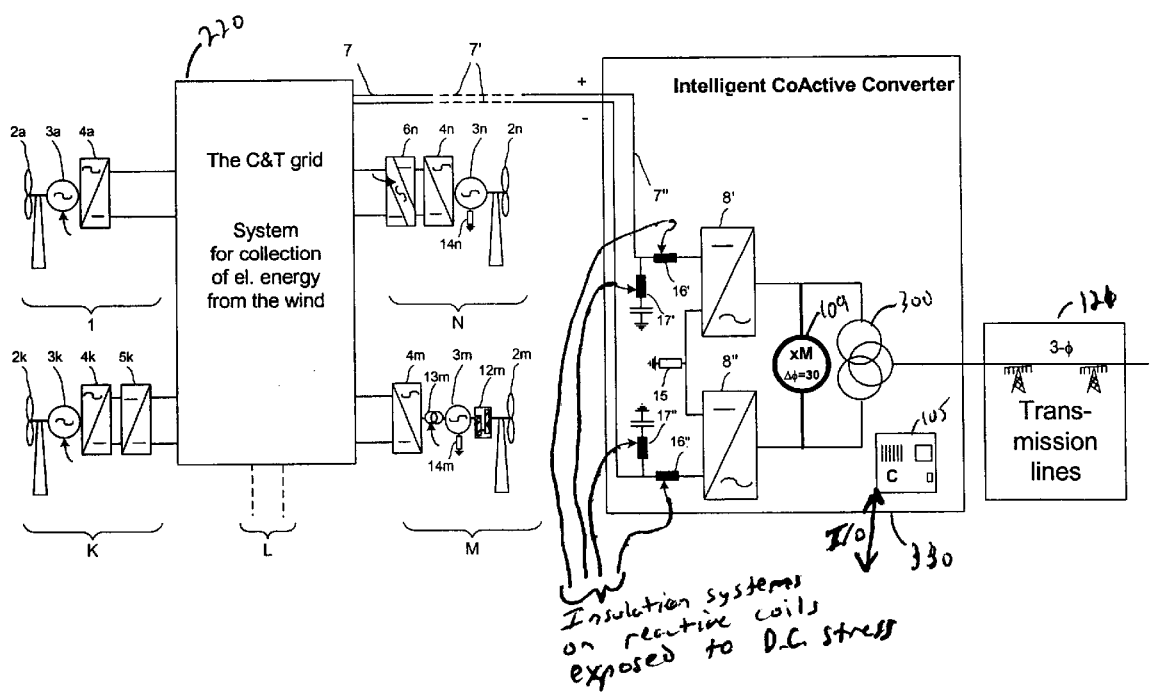
FIG. 3 shows a more detailed block diagram of renewables that connect to a C&T HVDC grid, whereby the windings in the rotating AC machine and the power transformer are stressed by a mix of AC and DC voltage.

FIG. 3 shows a more detailed block diagram, than that shown in FIGS. 1 and 2, and describes a more specific renewable facility, a wind turbine farm and a DC collection and transmission (C&T) high-voltage grid, as a preferred embodiment of the present invention. The different renewable facilities 1, N, K, and M, are each configured differently to show that DC output from the different facilities may be collected uniformly on the collection and transmission grid 220. Renewable facility 1 includes a turbine 2a generator 3a and AC to DC converter 4a that connects to the collection and transmission grid 220. Renewable facility K includes similar elements to that of renewable facility 1 (namely elements 2K, 3K, 4K) as well as an additional DC-to-DC converter 5K so as to adjust the characteristics of the DC voltage applied to the collection and transmission grid 220. The renewable facilities N includes similar components to that of renewable facility K, although also includes a high impedance (fault-current limiting grounding connection 14N connected to the generator 3N and a DC-to-AC-to-DC converter 6N as shown. Renewable facility M includes a gear box 12M connected between turbine 2M and generator 3M. Furthermore, transformer 13M is connected between generator 3M and AC-to-DC converter 4M as shown. There is also here a high impedance (fault-current limiting) grounding connection 14M. The DC C&T grid can be embodied as parallel or series connection of the renewable facilities, as described in Swedish patent Application No. SE 00/02616 and Swedish patent Application No. SE 01/00259, the contents of each of which being incorporated herein by reference.

The intelligent coactive converter 330 is connected to the collection and transmission grid 200 by way of an HVDC line 7 and 7'. The positive and negative lines 7 and 7', respectively, are provided to in-line reactive filter impedance 16' and 16" as shown, and across impedance and capacitance 17' and 17" as shown. The arrows pointing to elements 16', 16", 17' and 17" indicate that the insulation systems of these reactive coils are exposed to D.C.-stress. DC-to-AC converters 8' and 8" are connected to one another with a high impedance (fault-current limiting) connection 15 to ground. The respective AC outputs from the DC-to-AC converters 8' and 8" are connected to an AC transformer 300 that couples the power output to the transmission lines 121. The two DC-to-AC converters provide a 12-pulse coupling, and the xM is a two times 3-phase (2*3Φ) machine connected across the AC outputs from the respective DC-to-AC converters 8' and 8", i.e. between the DC-to-AC converters and the AC transformer 300. As was the case with FIG. 1, the xM 109 is a specific embodiment of a yM device. Thus, a variant of the xM 109, as long as it is a yM device, may be used as a replacement for xM 109. The controller 105 controls operations of the intelligent coactive converter 330 as well as coordinates communications with external devices when necessary (I/O input not shown in this figure).

Figure 14:
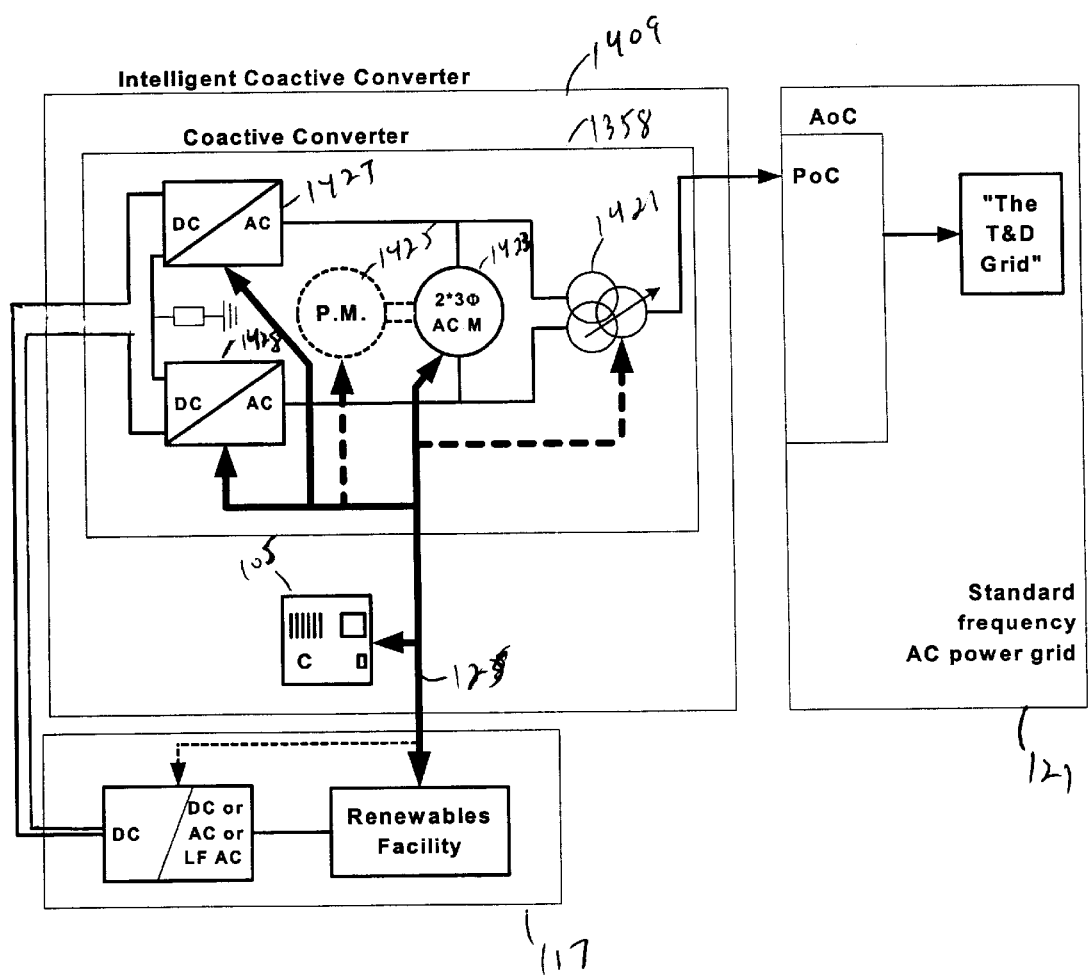
FIG. 14 is a block diagram showing a system according to the present invention that includes a DC link from a renewables facility to an intelligent coactive converter that is configured to convert DC to multiphase AC according to the present invention.
Figure 15:
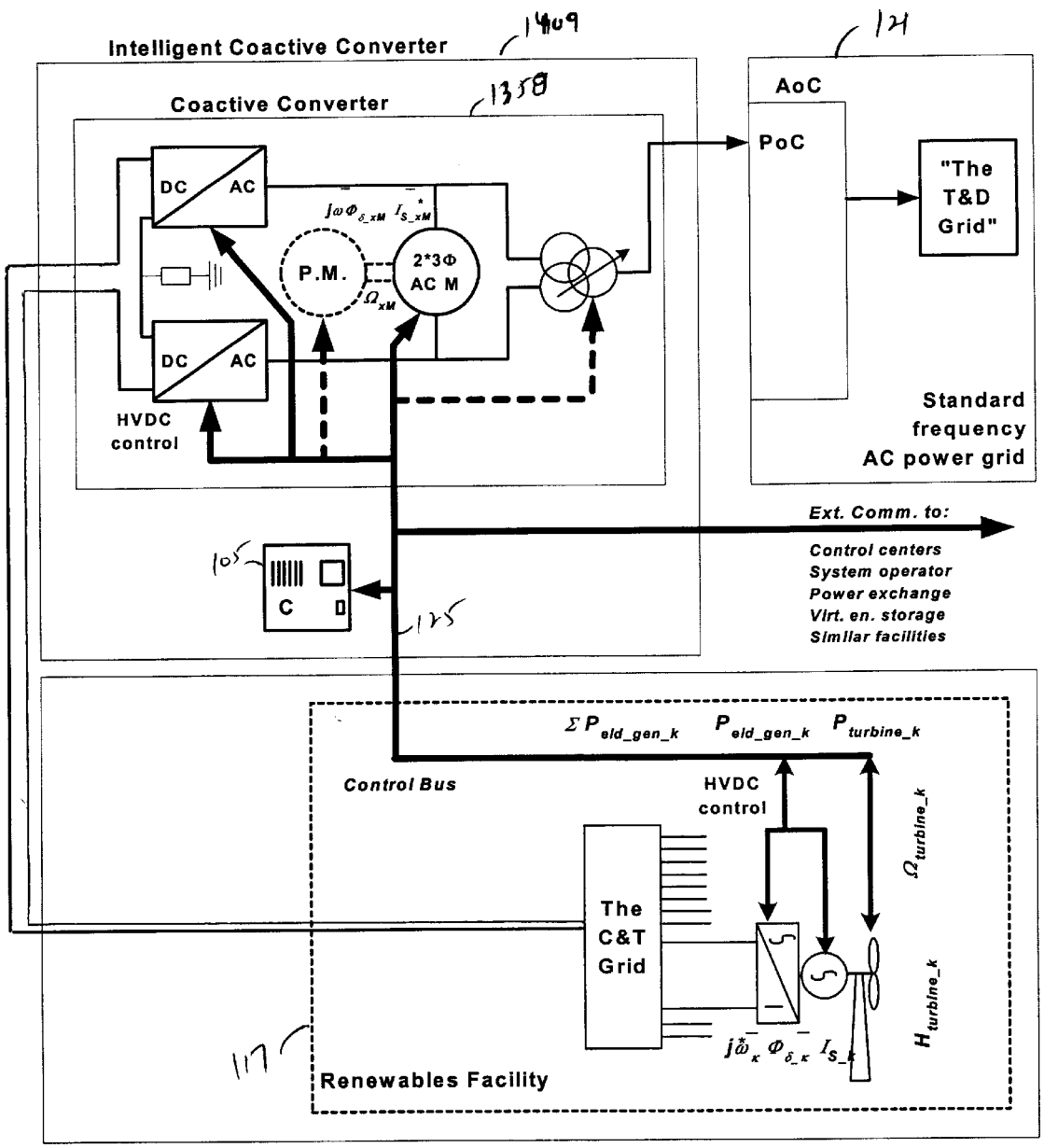
FIG. 15 is a block diagram of the system like that shown in FIG. 14, but also includes external communication capabilities for coordinating with a virtual energy storage facility.

Attributes and Characteristics of C&T Grids Associated with the Present Invention The electric power, produced by a renewable facility, is collected and transmitted via various types of Collection & Transmission Grids, C&T Grids:

a DC power grid (FIG. 3)
a low frequency AC power grid (FIG. 2)
a standard frequency AC power grid (FIG. 4)
These can be embodied as a meshed C&T grid, as a radial C&T grid or as a mixed meshed and radial C&T grid. The DC power C&T grid (FIG. 3) is preferred especially for renewable facilities located far from a sub-station in the standard frequency AC power grid:
It includes power semiconductor converters to convert the power from AC to DC and vice versa.
The point-of-connection and area-of-connection to the standard frequency AC power grid which is of main interest. Thus a HVDC line may interconnect a remote renewable facility to the coactive converter, which is located next to the point of connection (FIGS. 14 and 15).

Figure 4:
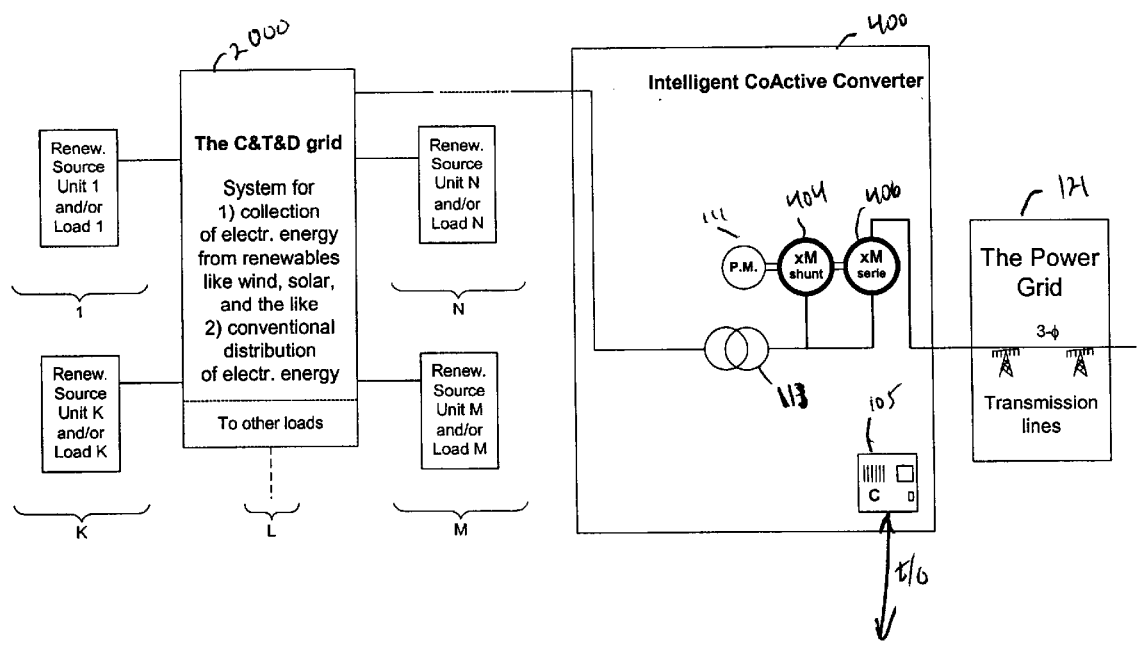

Referring to FIG. 4, the present embodiment uses optionally a shunt-series AC machine embodiment, a rotating AC machine denoted $xM_{Shunt}$ and a recent invention's $xM_{serie}$. As was the case with FIG. 1, each xM 109 is a specific embodiment of a yM device. Two xM devices may be used, or at least one of the devices is a SM. Thus, any variant of the yM devices may be used as a replacement for xM 109. The controller 105 perpetually models and controls the actual converters' operational status:

1. including air-gap-flux $\overline{\Phi}_\delta$, stator currents $\overline{I}_S$, rotor currents $\overline{I}_R$, load angle δ, power factor cos φ and the like in the actual rotating machines; and
2. firing angles α, respect angles γ and the like in the actual power electronic converters;
3. as well as voltage control and similar features associated with reactive power; and
4. the active power balance and inherent—by computer control—torque relations to create and keep reasonably small margins for best cost-effectiveness and best availability.

In AC C&T grids, the invention can still be applied to perform some of the (P & Q or P & U) duties discussed above wherein the renewables power facilities can be of any kind as shown in FIG. 4. FIG. 4 is a block diagram of another more detailed embodiment where all frequency conversion is made to a standard frequency AC, located close to the primary sources which can be any renewable facility, like wind turbine plants, solar electric power plants and the like. The formerly described C&T grid operates now with any of the standard frequencies AC (either 50 or 60 hertz) and can therefore allow conventional loads, thus denoted C&T&D grid 2000. The rotating machine, xM (actually one or two devices), is located on the high-voltage side and may be embodied as a shunt machine 404 only or as an AC grid power flow controller, i.e., as a shunt machine and a series machine 406, in accordance with PCT/EP 98/00744, WO 99/29008 POWER FLOW CONTROL, the contents of which being incorporated by reference. Connection with a series AC machine 406 is done to stabilize the C&T&D grid 2000 to a higher degree than with a shunt machine 404 alone.

Features and Characteristics of a Power Flow Controller Applicable to the Present Invention A power flow controller, with a rotating AC machine connected as a shunt machine and with another rotating AC machine connected as a series machine with a common shaft, serves as a power stabilizer mechanism when the electric power, produced by a renewable facility, is collected and transmitted via a standard frequency AC power grid.
Its preferred embodiment includes a standard frequency AC constant-frequency machine (xM) with a varying/variable speed.
It can store energy in its moment of inertia and its rotor speed (in radians/sec), following the torque or power equation, e.g., equation (4).
In its most traditional embodiment, it includes slip rings and brushes, but in the series of recent inventive improvements described above, it may be configured as a brushless machine.
It provides voltage stiffness and short circuit power to the standard frequency AC power grid at a short electrical distance from its point-of-connection.
It provides negligible variability in the active power fed in to the standard frequency AC power grid and eliminates the (active power) variability in the electric power produced, e.g., by sources like renewable facilities, in its area-of-connection.

Figure 5:
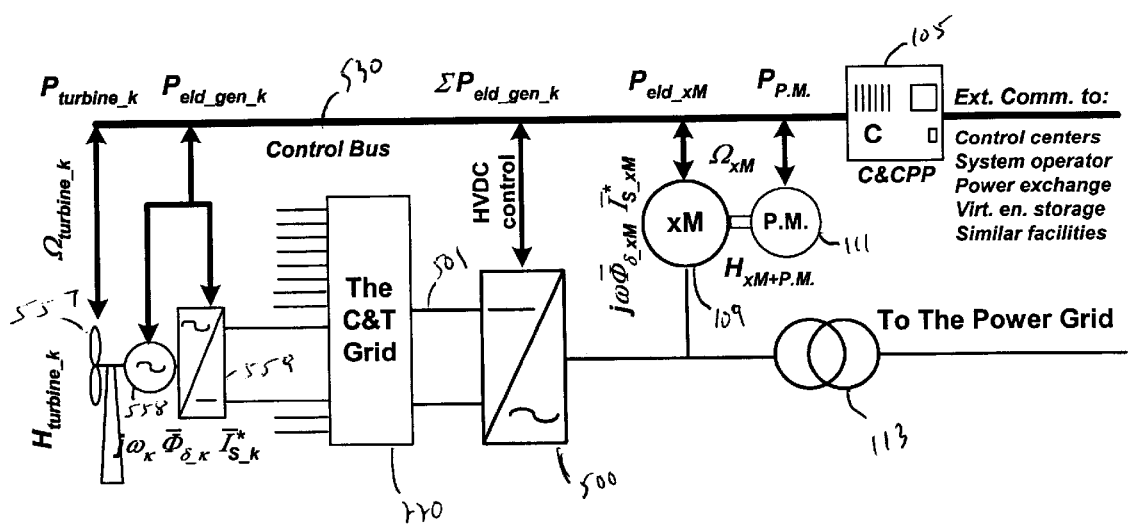
FIG. 5 shows a principle block diagram with principal main circuits, features for energy storage $H_{turbine\_k}$ and $H_{xM+P.M.}$ and main control and communications computer, C, which generates control parameters like $P_{turbine\_k}$ and $P_{eld\_gen\_k}$ and $P_{eld\_xM}$ and $P_{PM.}$ and performs external communications, where subscript eld denotes electrodynamic power.

FIG. 5 describes some of the parameters that are used by the controller 105 for monitoring and for controlling the xM 109, prime mover 111, DC-to-AC converter 500, collection and transmission grid 220, control bus 530, as well as wind turbine 557, generator 558, and AC-to-DC converter 559. As was the case with FIG. 1, the xM 109 is a specific embodiment of a yM device. Thus, any variant of the yM devices may be used as a replacement for xM 109. The controller 105 is able to calculate and perform appropriate modeling according to the equations that are described below.

The equations, that describe the renewable facilities' interaction, can be formulated as power equations independent of how the C&T grid 200 is embodied, e.g. DC, or LFAC or standard frequency AC and series or parallel connection of the renewable facilities. The power losses are omitted in the description for clarity but are easily incorporated, as will be appreciated by one of ordinary skill in the power systems art. The symbols are described as they appear in the description.

The equation that describes the wind turbine No. k's shaft input $P_{turbine\_k}$ and its generator's supply $P_{eld\_gen\_k}$ to the C&T grid is as follows:

$$P_{turbine\_k} - P_{eld\_gen\_k} = J_{turbine\_k} \cdot \Omega_{turbine\_k} \cdot \frac{d\Omega_{turbine\_k}}{dt} \quad (1)$$

where the moment of inertia in turbine No. k is $J_{turbine\_k}$ and its associated adjustable speed is $\Omega_{turbine\_k}$ in a dynamical balance so that its time derivative is fairly low. $P_{eld\_gen\_k}$ may be written and modeled with the air-gap flux $\overline{\Phi}_{\delta\_k}$ and the stator current $\bar{I}_{S\_k}$ as:

$$P_{eld\_gen\_k} Re\ \{3j\omega_k \cdot \overline{\Phi}_{\delta\_k} \cdot \bar{I}^*_{S\_k}\} \quad (2)$$

which is more concise than if it is written in d-q-quantities in a two-axis reference frame. Reference is made to WO 00/67358, the entire contents of which being incorporated herein by reference.

The equation that describes the C&T grid with k=1, . . . , N wind turbines (renewable sources) and their dynamical power balance cooperation with the power $P_{eld\_xM}$ from the coactive converter's xM 109 and the power $P_{P.M.}$ sent into the AC power grid is:

$$\sum_{k=1}^{N} P_{eld\_gen\_k} + P_{eld\_xM} = P_{grid} \quad (3)$$

where the constant frequency variable/varying speed machine xM's power relations is described as:

$$P_{P.M.} - P_{eld\_xM} = J_{xM+P.M.} \cdot \Omega_{xM+P.M.} \cdot \frac{d\Omega_{xM+P.M.}}{dt} \quad (4)$$

$$P_{eld\_xM} = Re\ \{3j\omega \cdot \overline{\Phi}_{\delta\_xM} \cdot \bar{I}^*_{S\_xM}\} \quad (5)$$

where the air-gap flux is $\overline{\Phi}_{\delta\_xM}$ and the stator current is $\bar{I}_{S\_xM}$. The corresponding imaginary part is associated with the reactive power.

There are numerous references on how to control the turbine's output $P_{turbine\_k}$ to its generator shaft by pitch control, etc., as a function of the wind force, and $P_{eld\_gen\_k}$ as another function by scalar or field vector control, etc., in order to control each turbine's and each generator's operating points, e.g., regarding air-gap flux $\overline{\Phi}_\delta$ and the stator current $\bar{I}_S$. Examples include WO 00/67358; Jan O. Gjerde et. al. in "Integration of Adjustable Speed Hydro Machines in Established Networks", Proc. of Hydropower into the Next Century—III (Hydropower '99), Gmunden, Austria, 1999, pp. 559–567; Jan O Gjerde et. al. "Consequences of Introducing Adjustable Speed Hydro (ASH) in Established Power Networks", Proc. of PSCC'99, Vol. 1, pp. 150–156, Norwegian Univ. for Technology and Science, Trondheim, 1999. It is once again pointed out that some of the equations are, for simplicity reasons only, written in complex notation instead of d-q which is used in U.S. Pat. No. 5,083,039 and 5,225,712.

It is emphasized that there is a freedom in power generation control compared to industrial and tractional motor control. The speed $\Omega_{turbine\_k}$ need not to be kept constant or exactly on the optimum operation point if the reliability or availability of the electrical power transmission is maintained in a better way than on the optimum operational point, but prevented from energizing a mechanical resonance in the shaft system by torque oscillations or torque steps in the shaft.

Furthermore, there is an upward limit for the turbine's speed $\Omega_{max\_turbine\_k}$, but the turbine's moment of inertia can store a considerable amount of energy, in a per unit system expressed as its inertia constant:

$$H_{turbine\_k} = \frac{0.5 \cdot J_{turbine\_k} \cdot \Omega^2_{nom\_turbine\_k}}{P_{nom\_gen\_k}} \quad (6)$$

where $H_{turbine\_k}$ is in the range of 3 to 5 seconds for megawatt wind turbines. $H_{turbine\_k}$ in the range of 3 to 5 seconds means that the stored energy is equivalent to nominal power during 3–5 s. A similar inertia constant expression $H_{xM+P.M.}$ can be written for the rotating parts associated with the optional prime mover P.M. and the inventive rotating machine xM where $H_{xM+P.M.}$ also is in the range of seconds for rotating electrical machines rated at tens of megawatt.

When the invention is embodied with a DC-based C&T grid, there is a need to provide an HVDC-system control either with a known current-source-converter or a known voltage-source-converter in the coactive converter.

The controller therefore exerts system control by modeling, monitoring and adjusting parameters like $P_{turbine\_k}$ and $P_{eld\_gen\_k}$ and $P_{eld\_xM}$ and $P_{P.M.}$ and associated reactive power quantities, where the computer and the computer program product in controller 105 calculates reference values which are sent to local computer-based controllers in the wind farm via signal communication well known to the man skilled in the art.

Figure 6:
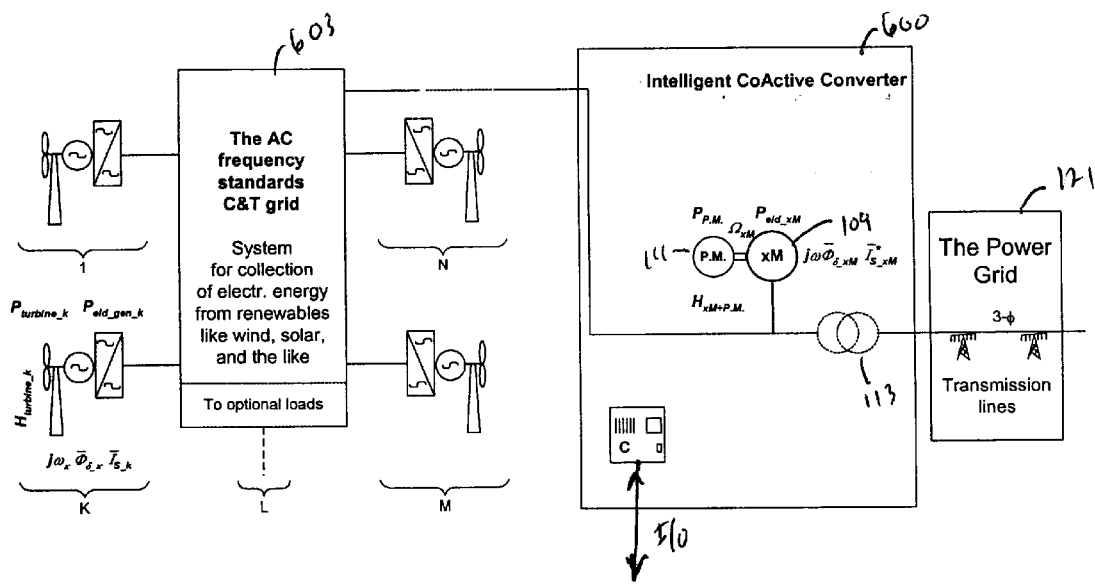
FIG. 6 shows an embodiment for an AC standard frequencies C&T grid.

FIG. 6 is a block diagram of the system according to the present invention and includes an intelligent coactive converter 600, that in turn includes an xM 109 connected to a prime mover 111 connected in shunt to an output from an AC frequency standard C&T grid 603. As was the case with FIG. 1, the xM 109 is a specific embodiment of a yM device. Thus, any variant of the yM devices may be used as a replacement for xM 109. An optional transformer 113 is included between an output of the C&T grid 603 and the xM 109. The output of the transformer 113 connects to the power grid 121. As can be seen, the output from a variety of different renewable sources each of which provide standard AC frequency may thus provide cumulative output to the C&T frequency standard C&T grid 603. These renewables 1, N, K, and M contribute to the overall electric energy collected from renewable facilities.

Figure 7:
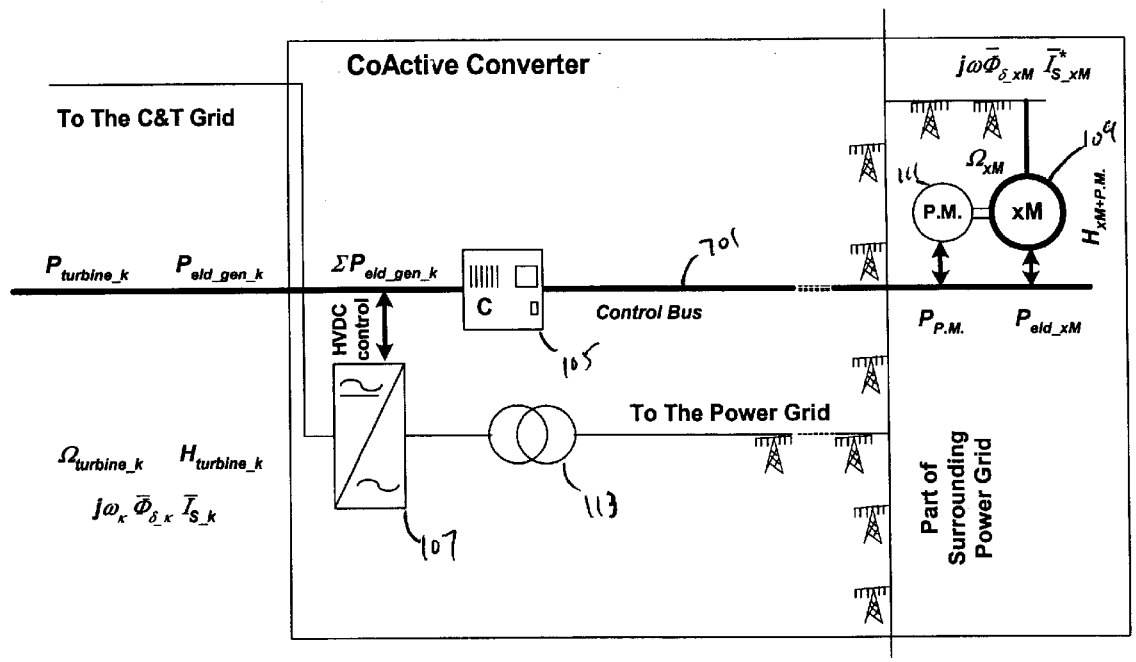
FIG. 7 is a block diagram that shows that the coactive converter can be divided into two parts, but located in the vicinity of each other so that a reactive power injection at a bus in the surrounding AC power grid will generally increase the voltage of the coactive converter.

FIG. 7 is a expanded diagram of a coactive converter embodied in the form of a substation. The coactive converter includes a power semiconductor converter 107 that receives high voltage DC or low-frequency AC and converts the same to a standard AC. The control of the converter 107 is provided by way of the controller 105 via a control bus 701. The output of the power semiconductor converter 107 is provided to a transformer 113 and in turn connects into the power grid. The control bus 701 also connects to the prime mover 111 and xM 109 so as to control the prime mover 111 and xM 109 regarding output provided thereby to the surrounding part of the power grid. As was the case with FIG. 1, the xM 109 is a specific embodiment of a yM device. Thus, any variant of the yM devices may be used as a replacement for xM 109.

Figure 8:
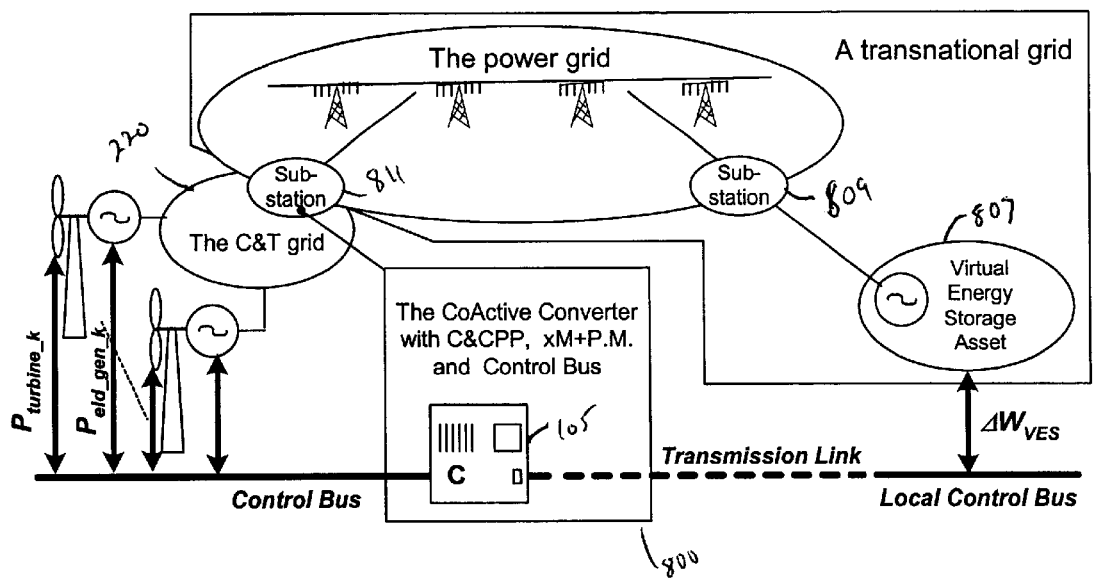
FIG. 8 is a system level block diagram that shows an interconnection with a virtual energy storage facility.

FIG. 8 is a block diagram of the system according to the present invention and includes a coactive converter 800 that includes a controller 105. The controller 105 controls operations of renewable facilities that connect to a C&T grid 220, which in turn connects to a substation 811. A transmission link interconnects the controller 105 to a virtual energy storage facility 807 so as to control a differential power production output from the different renewable resources that contribute energy to the C&T grid 200 and to the power grid 812. The virtual energy storage facility 807 provides power to a substation 809, which complements the power provided by the renewables via the substation 811 to the power grid. The power grid may be a transnational grid, thus coupling resources from different countries.

Figure 9:
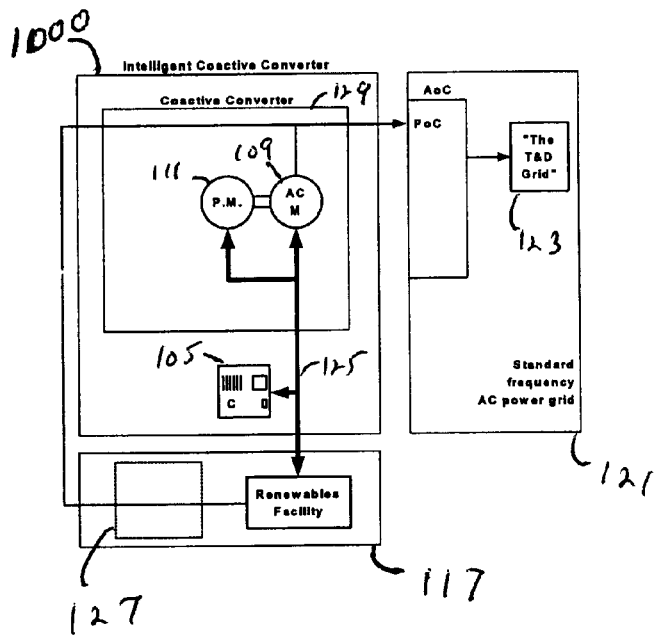
FIG. 9 is a block diagram of a system according to the present invention in which there is a single point of connection to a power grid from an intelligent coactive converter.

FIG. 9 is a block diagram of an intelligent coactive converter 1000 that includes a coactive converter 129 and the controller 105. The controller 105 connects to the prime mover 111 and xM 109 (a SM) by way of a control bus 125. The control bus also interconnects the controller 105 with the renewable facility 117, which may optionally include a DC-to-AC converter or AC-to-AC converter 127. The output of the coactive converter 129 is applied to a single point of contact and in turn is connected to a transmission distribution grid 123 as part of a standard frequency AC power grid 121.

Features and Characteristics of SMs Applicable to the Present Invention

A traditional synchronous machine, SM, is a fairly stiff voltage source that can provide short circuit power to stabilize the power grid to which it is connected. However, as presently recognized, It can store energy in its moment of inertia and its rotor angle δ (in electrical radians), following the swing equation in which the power grid is mainly incorporated as a reactive transmission line connected to a stiff voltage source.

It provides voltage stiffness and short circuit power to the standard frequency AC power grid at a short electrical distance from its point-of-connection.

It reduces the (reactive power) variability in the electric power produced, e.g., by sources like renewable facilities, in its area-of-connection.

Figure 10:
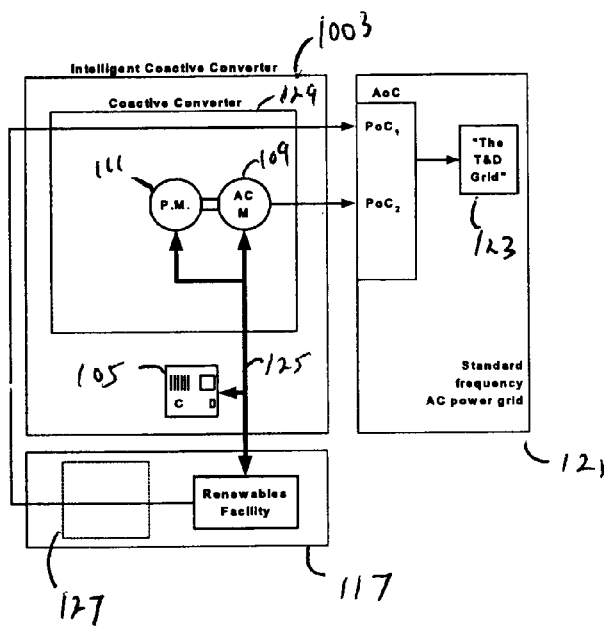
FIG. 10 is a system like that shown in FIG. 9 according to the present invention, but provides at least two points of connection.

FIG. 10 is like that of FIG. 9 although includes an intelligent coactive converter that provides two outputs: one output being from the renewable facility 117 (optionally by way of the DC to AC, or AC to AC converter 127); the other output being from the xM 109. Providing multiple outputs helps provide stability to the area of connection at the power grid by providing reactive power where necessary to the power grid.

Figure 11:
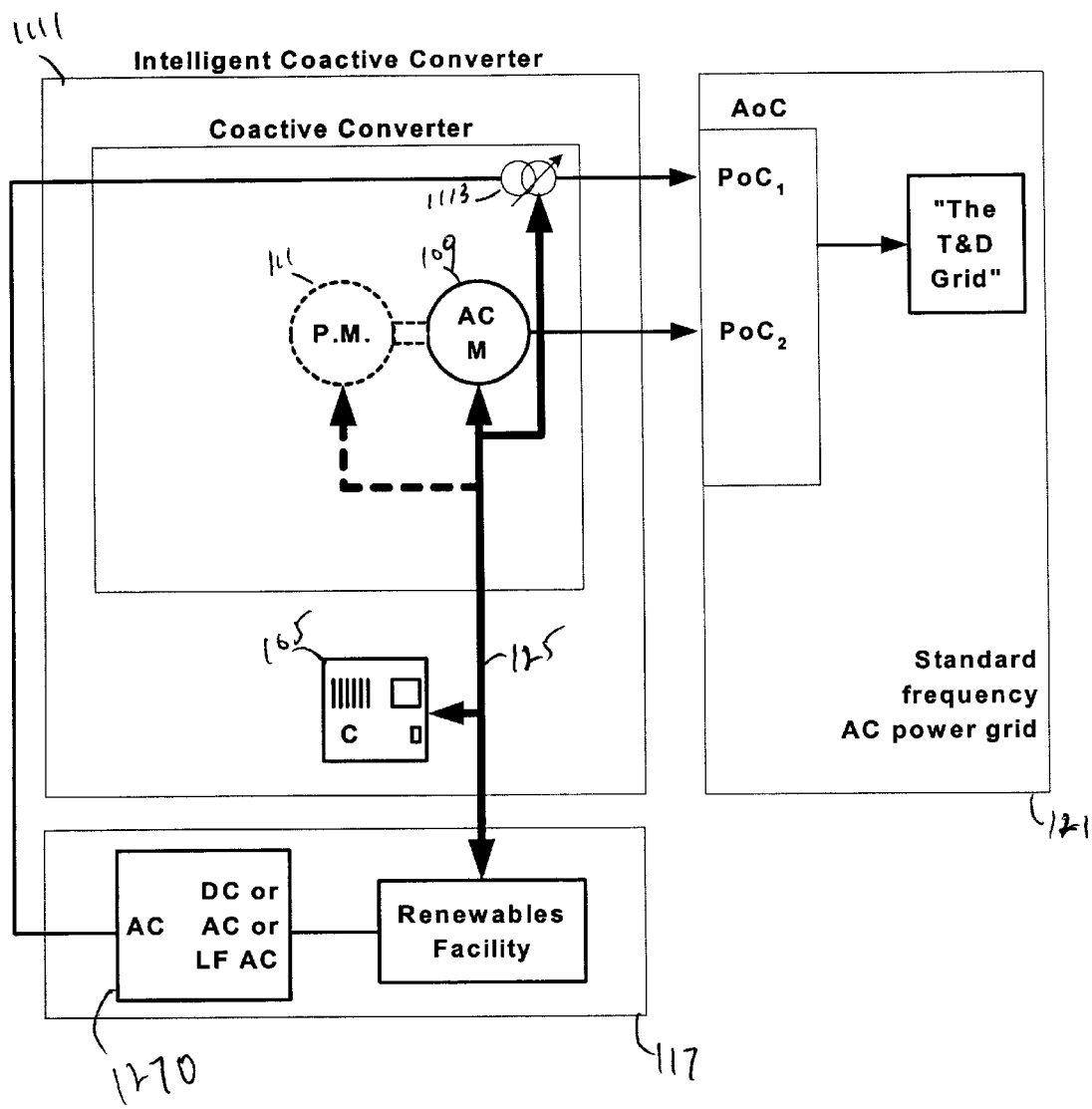
FIG. 11 is a block diagram of a system according to the present invention in which an intelligent coactive converter includes multiple connections to a power grid, one of the connections including a controllable transformer.

FIG. 11 is a block diagram that is similar to the system shown in FIG. 10. A difference however is that the renewables facility 117 includes a DC, AC or LFAC-to-AC converter 1270 which in turn connects to a transformer 113. The intelligent coactive converter 111 includes a prime mover 111 an xM 109 and optionally also a power transformer with a tap-changer that are controlled by a controller 105 by way of a control bus 125.

Figure 12:
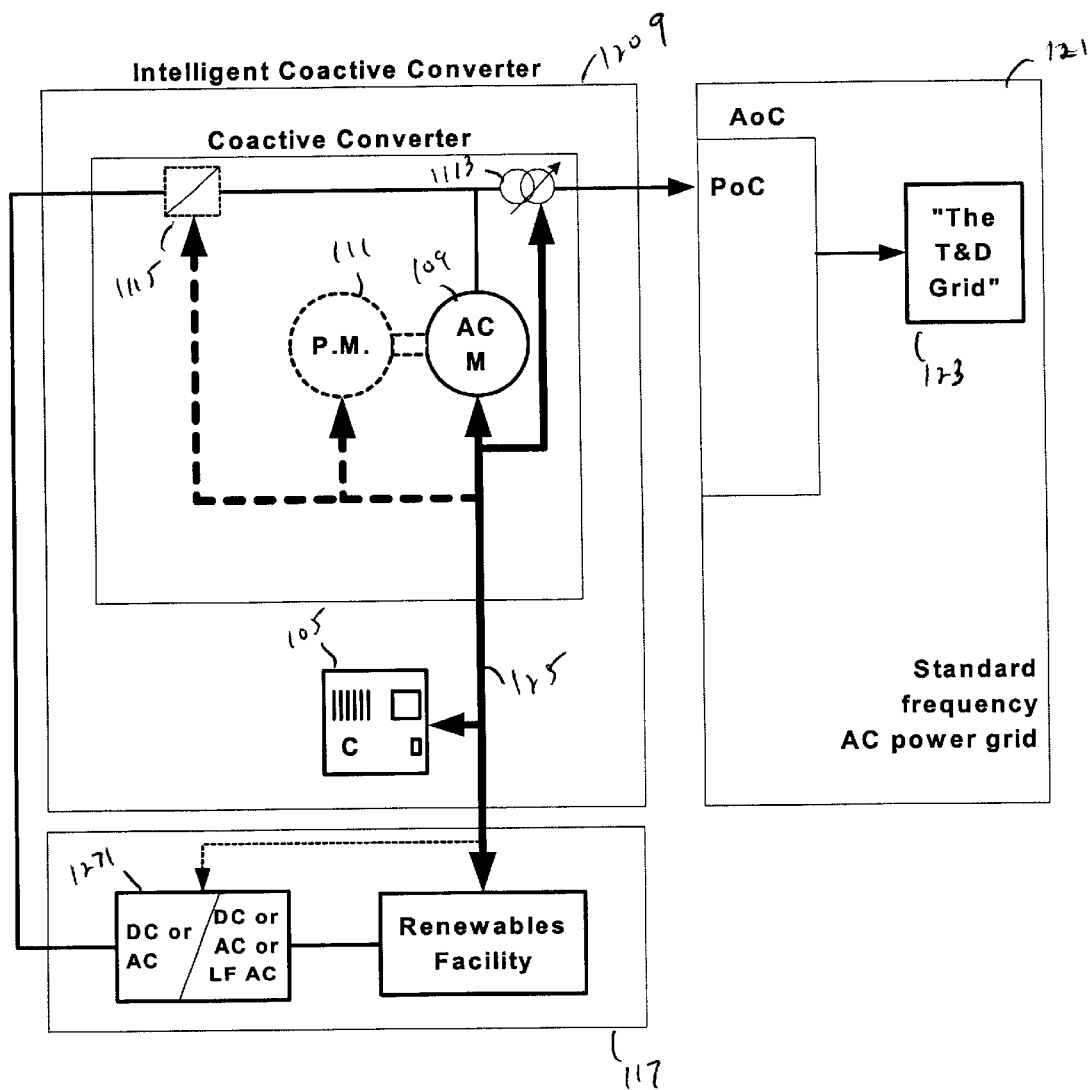
FIG. 12 is a block diagram of a system like that shown in FIG. 11, but includes an optional provision for including a high voltage DC, or AC output from a renewables facility through a conversion device to a transformer included as part of an intelligent coactive converter according to the present invention.

FIG. 12 is a block diagram of a system according to the present invention that comprises a distributed AC-to-DC-to-AC conversion mechanism. The output of the renewable facilities 117 includes a DC, or AC or LFAC-to-AC or DC converter 1271. A DC to standard AC power converter 115 is used when DC is provided from the renewables facility 117, or AC to AC power converter when low-frequency AC is provided from the renewables facility 117. The control bus 125, as part of the intelligent coactive converter 1209 provides command instructions to both the xM 109 and tap-changer of transformer 1113, when adjusting the output from the intelligent coactive converter 1209, where the output is provided to a standard frequency AC power grid 121 by way of the T&D grid 123.

Figure 13:
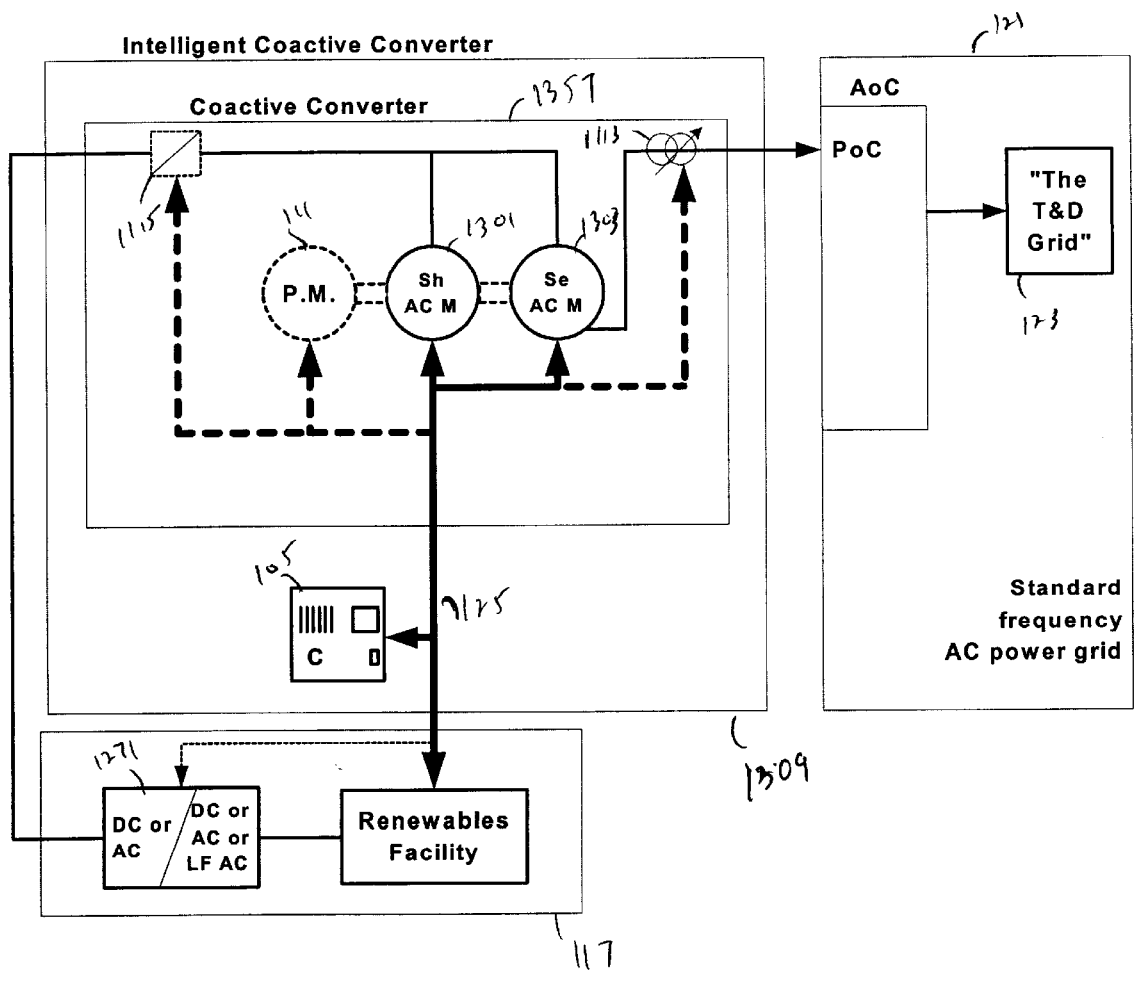
FIG. 13 is a system according to the present invention, containing features like that described in FIG. 12, but also includes a plurality of AC machines, at least one being a shunt machine and another being a series connected machine according to the present invention.

FIG. 13 is like the block diagram of FIG. 12, but includes an intelligent coactive converter 1309 that includes both a shunt xM 1301 and a series connected xM 1303 as part of the coactive converter 1357. The output from the transformer 1113 is provided to a point contact on a standard frequency AC power grid 121.

FIG. 14 is a block diagram which shows renewable facilities 117 that provides a DC output. The DC output is provided to an intelligent coactive converter 1409 which in turn includes a coactive converter 1358 that includes a first DC-to-AC converter 1427 and a second DC-to-AC converter 1428, each of which are controlled by the controller 105 by way of the control bus 125. The output from the two DC-to-AC converters provides a 12-pulse coupling, where the output of the respective DC-to-AC converters is provided to a 2*3-phase (2*3Φ) high power transformer 1421 for providing energy output at a single point of connection on a standard frequency AC power grid 121. Between the respective outputs of the DC-to-AC converters 1427 and 1428, is disposed a 2*3-phase xM 1423 with an optional prime mover (P.M.) 1425. The three-phase xM is able to provide reactive power on demand and under control of the controller 105 for providing, when required, active or reactive power to the standard frequency AC power grid at the point of connection.

FIG. 15 is like that of FIG. 14, but includes a connection on the control bus 125 to external devices such as a virtual energy storage facility. The virtual energy storage facility is able to supplement the power provided by the renewable facility in a fungible ganged operation, or even hold in reserve excess production for future use, perhaps during a lull at the renewable facility.

The present invention enhances electric power produced by renewable facilities like wind power plants and reduces the weakness and variability in the power $P_{grid}$ fed into the standard frequency AC power grid with preferable levels of voltage stiffness and of short circuit power. It is fulfilled by using inherent, mainly electromechanical, characteristics that are available by computer control.

An example of this is to use the moment of inertia normally inherent in the wind turbines and the rotating electrical machines to reduce the influence from weakness and variability.

Another example is to use the current overload capabilities inherent in the rotating electrical machines to provide short-term short circuit power, by utilizing the inherent adiabatic character of the windings' copper temperature rise, to provide fault handling, system protection and voltage stiffness.

Still another example is then to use the rotating shaft to assure deliveries of previously sold energy in case of lack of transmission capability by clutching prime movers.

There is furthermore an accompanying preferred overall system solution by using a Virtual Energy Storage facility as described in U.S. patent application Ser. No. 091749, 999, to reduce the operational time of the optional prime mover and its associated maintenance.

Reference is now made to the previous description of sources and sinks of active power and their interaction with sources and sinks of reactive power.

The other sources and sinks as well operational (P & Q and/or P & U) grid characteristics are relevant to electric power that is applied from a weak C&T grid to an electric grid after being generated from renewables, e.g.:

Power electronic converters based on IGBTs, GTOs, SCRs and the like, can 1) transfer power from an asynchronous machine or an armature winding of a SM to a power grid;
2) be imbedded in rotating electrical machines like xM, whereby the machine's armature winding is directly connected to the grid; and
3) to be combined with the rotating machines like SM or xM to improve the performance, from a grid point-of-view, compared with the IGBT-, GTO- or SCR-converters alone.

The xM can be operated as a generator or as a motor at adjustable speed, depending on its production or consumption of active power. The xM also stores energy in the moment of inertia, J, often associated with the technical term inertia constant, H.

Jointly the xM and prime mover, xM+P.M. and/or SM+P.M., can be operated as a generator or as a motor at adjustable and/or constant speed, depending on its production or consumption of active power. The prime mover can store and release energy in several devices, compressed air energy store, CAES, and the like and thus not only utilizing the moment of inertia, J.

Another, system-oriented, part of the actual invention is providing a mechanism to control a local power grid, e.g., the C&T grid, with a controller present that monitors and controls voltage levels in the grid and/or air-gap flux levels $\Phi_\delta$, where $\delta$ is the air-gap in the machine ($\delta$ is used both as the rotor or load angle in an electric machine and the air-gap, both meanings of the symbol are used in their conventional way and as to be understood from the context) in the rotating machines. This approach is in opposition to the close to constant-voltage-level operation of traditional T&D grids.

Another, system-oriented, part of the present invention is to allow variations in speed as well as in AC phase angles internally in the C&T grid and the coactive converter whereby the moment of inertia is used for eliminating variability in wind speed and the like. Thus, the system uses the inherent moment of inertia by drawing out (and sending back) a part of the energy stored in the rotating parts of the renewables electric power generation facilities. ("Two-in-one").

AC phase angles internally at the C&T grid's terminals into the coactive converter are perpetually controlled by the series machine of the power flow controller (discussed in more detail in PCT publication WO 99/29008) and thus drawing out (and sending back) a part of the energy stored in the shunt machine in the same power flow controller. This can be described as an expansion of the swing equation where V, $\delta$ and $X_T$ are controlled via the series machine. The series machine is therefore located between the shunt machine and the AC power grid to facilitate the desired stabilization to overcome variability.

AC phase angles internally at the C&T grid's terminals into the coactive converter may be operated by a (Thyristor Controlled) Phase Shifting Transformer, PST or TCPST and thus drawing out (and sending back) a part of the energy stored in the shunt machine in the same power flow controller. This operation can also be described as an expansion of the swing equation where, V, $\delta$ and $X_T$ are controlled via the PST or TCPST to facilitate the desired stabilization to overcome variability.

Recapitulation of Selected Features, Attributes and Characteristics of the Present Invention An intelligent coactive converter is connected to a standard frequency AC power grid and enhances electric power produced by a renewable facility. A constant-frequency output, rotating AC machine, a digital processor with a computer program product (a controller) and, communication and control mechanisms are included in the intelligent coactive converter. The digital processor and the computer program product control, via the communication link, the rotating AC machine and rotating AC machines in the renewable facility, to prime, regarding voltage stiffness and power variability, the electric power produced by the at least one renewable facility when feeding the power to the standard frequency AC power grid.

A point-of-connection (PoC) is defined in order to connect the intelligent coactive converter to a standard frequency AC power grid in a grid area-of-connection (AoC). An AC power grid can be characterized by its reactance values between its bus-bars. Two bus-bars can be said to be electrically close to each other if the reactance, as seen between the two bus-bars, is negligible or at least smaller than a pre-specified value, let's say 0.03 to 0.10 p.u. AC power grids possess mainly reactive impedance which indicates that they are more sensitive to variations in reactive power from voltage and flicker. A rotating AC machine (SM or xM) can, via its ability to supply and consume (mainly reactive) power, provide voltage stiffness to the standard frequency AC power grid in its area-of-connection. A rotating AC machine can, via its ability to supply and consume (mainly active) power, provide reduced variability in the associated active power applied to the grid.

When the rotating AC machine is driven by a prime mover and fed from an energy storage facility, it ensures delivery of electric power from the area-of-connection to be sold on forward contracts from the renewable facility as (renewable) electrical energy on a power exchange.

Selected Attributes and Characteristics of System

The electric power produced by one (or more) renewable facility is fed through a radial, meshed, or, radial and meshed, C&T grid, to the standard frequency AC power grid via the power transformer together, with power from the rotating AC machine (SM or xM) and its optional prime mover (FIG. 3), with embodiments described above and below:

The power transformer at the point-of-connection is preferably embodied as a 2*3Φ and the DC-AC converter is thereby a 12-pulse converter, having two 6-pulse converters with a DC series connection at their DC sides.

The rotating AC machine (SM or xM) is preferably located between the DC-AC converter and the power transformer.

The rotating AC machine (SM or xM) is preferably embodied as a transformer-less machine and with two three-phase sets of stator windings, one for each 6-pulse converter.

Both the power transformer and the rotating AC machine (SM/xM) are thereby preferably embodied with cable-based windings which are insulated for high-voltage (as discussed in PCT Patent Publications WO 97/45919 and WO 97/45847) and stressed by a mix of AC and DC voltage as discussed in Swedish patent Application No. SE 00/02616, and Swedish patent Application No. SE 01/00259.

Both the power transformer and the rotating AC machine (SM/xM) are thereby important power engineering equipment components of the intelligent coactive converter.

The combination of a high-voltage rotating AC machine (SM/xM) directly, transformer-less, connected to a DC-AC-converter is believed to be a new structure having various advantages over conventional structures.

It utilizes characteristics of the cable-based stator (armature) windings, e.g., electrical AC/DC-insulation and is beneficial with a close magnetic coupling between the two three-phase sets of stator windings.

It provides reactive power as well as short-circuit power both to the standard frequency AC power grid and to the DC-AC-converter.

It provides voltage stiffness primarily to the DC-AC-converter and secondarily to the standard frequency AC power grid. The latter degree is depending on the short-circuit reactance values for the power transformer.

Therefore, the high-voltage rotating AC machine is a preferred, novel embodiment with two three-phase sets of stator windings, but without any step-up transformer consuming reactive power and reducing the short-circuit capacity, SCC, which is an important characteristic to determine an SCR-based power semiconductor converter's commutation procedure and especially its overlap angle.

It was earlier described, in reference to problem of type (f), that there is a need for an energy storage capability during faults where voltage sags appear and the transferable power capability from wind to grid is temporarily reduced. The reduction maybe to as low as 5 to 10% of nominal power value during fault time of some 0.2 seconds. This is a standard criterion for power plants usually solved by an inertia criterion, e.g. in hydro power plants. The mains-commutated (SCR-based) power semiconductor converters cannot continue to convert active power from DC to AC because there is a lack of commutation voltage. Problems of type (f) have up until now been solved by tripping the renewable plants for SCR-based power semiconductor converters. Another solution is to use self-commutated power semiconductor converters, introducing the problem of short-circuit power when renewables are introduced on large scale. Problems of type (f) can be solved by the present invention simply by using the controller to control the storage of energy in the moment of inertia associated with the wind turbines and with the standard frequency AC constant-frequency machine as soon as the voltage in the standard frequency AC power grid tends to go below the tolerance value.

As opposed to conventional systems, methods and machines, the present invention is characterized at least by the following features:

1. There is (preferably only) one connection (but more than one may be used), "the coactive converter", from a set of wind mills/a number of wind farms or other renewable facilities, via the C&T grid to the power grid. The coactive converter handles the fluctuating power and primes it substantially outside the power grid.
2. The coactive converter can be embodied with an optional prime mover, P.M., which is a large step forward on making electric power from renewables as commercially valuable and fungible as electric power produced by traditional sources.
3. The rotating machine xM provides moment of inertia (J), i.e., an energy storage with an inertia constant $H_{xM}$, or $H_{xM+P.M.}$ either between the C&T grid and the power grid for a C&T grid embodied as DC or LFAC or at the point-of-connection (PoC) to the power grid for a C&T grid embodied as standard frequency AC. Both types of C&T grids are competitive embodiments for distributed/decentralized generation with renewable resources.
4. Regarding the connection to the power grid, the coactive converter, is preferably embodied at the (sub)transmission level, preferably in a substation, thus feeding in at least tens of megawatts. This level being more defined by the substation's short-circuit power level than its rated voltage.
5. The controller, in the coactive converter is contemporarily controlling the status of xM and of the power electronic converter.
6. "The C&T-grid" is—especially when the inventive system is embodied as a galvanically insulated DC or (LF) AC—an internal matter and need not be devised and designed with the traditional international electrical standards, which aim at fault currents to blow fuses and long mean-time-to-repair, MTTR, but with functional specifications, e.g., high-impedance grounding (such as described in PCT Patent Publication WO/0067358) keeping down fault currents to harmless levels (say <10 A) and keeping up the capability of transmitting power during insulation faults in cable networks.
7. A new main circuit lay-out according to the invention includes a galvanically insulated DC or (LF) AC circuit, for connecting wind turbines to the power grid. The circuit holds at least a static converter and a rotating converter. Both types can withstand DC voltage stress (as described in Swedish patent Application SE 00/02616, and Swedish patent Application SE 01/00259) on their insulation systems and thus allow new variants of circuitry compared to what is publicly known. A power transformer is preferred at the terminals to the power grid:

7a) to adapt the voltages in the power grid and in the C&T-grid to each other, 7b) to insulate the C&T-grid and allow a high-impedance grounding as well as a continuous mixed AC-DC-stress on the insulation system, and 7c) to devise a suitable level of short-circuit power, both towards the power grid and the C&T-grid.
8. Power and energy slacks, between the C&T grid and the power grid, are defined. (Second-scale relaying on the inertia constant. Minute-scale embedded control fulfilling demands of Eltra ELT1999-411a (Eltra is the Danish grid company on Jutland and Funen). Hour-scale acting on the power exchange.) It is not necessary to deliver the wind energy as a constant power and/or immediately via the coactive converter. One overall consequence is that there needs to be a balance regulation. The result is otherwise that the grid frequency varies, but it is negligible. Another consequence is that the turbines' speed will vary somewhat.
9. Power and energy slack can be defined inside the C&T grid. It should utilize the fact that the inertia constants of 3 megawatt wind turbines are on the order of 5 seconds, but keeping in mind that mechanical stresses could reduce the life-time of the wind tower and the wind turbines which feed the generator shaft.
10. No expensive, complicated energy storage unit is needed at the wind mills' DC voltage link. A virtual energy storage (optionally arranged by a business agreement) is used to fill the gap between energy sold and energy made available from the wind 11. The power grid's system voltages are able to be kept within their tolerances to avoid voltage collapse as discussed. Reactive power is thus treated as a slack parameter, contrary to conventional approaches (e.g., U.S. Pat. Nos. 5,083,039 and 5,225,712 and PCT Patent Publication, WO 99/07996), which focus on reactive power.

12. The reactive power capability from the coactive converter towards the power grid is cheap, based on a rotating converter, i.e., an electrical machine, and thus not based on current from a self-commutated inverter taken in quadrature to the active current component. Reactive power can be measured and controlled by use of the Hilbert transformation for the voltage, u(t), i.e. H{u(t)}, which provides a 90° phase shift. The reactive power can then be approximated with the time-integral of u(t), to obtain a 90° phase shift. The expressions, their background and consequences (mainly from a techniques of measurement point-of-view) can e.g. be found in L. Gertmar "On measurements of harmonic voltages, currents as well as various types of powers and voltamperes", presented at EPE'97 (European Power Electronics Association Conference) in Trondheim. A possibility could be created to use the inverter for small and/or rapid changes in reactive/quadrature power based on the definition that q(t)=−H{u(t)}·i(t)}

12a) via the negative Hilbert transform of voltages −H{u(t)} in the power grid, or 12b) approximation by $-H\{u_R(t)\} \approx \{u_T(t) - u_S(t)\}/\sqrt{3}$ in a three-phase system, or 12c) via integration $-H\{u(t)\} \approx -\int u(t) \cdot dt$ for any number of phases, i.e., alternative use of the grid voltages.

13. There is a prudence concept afforded by the present invention which can be described as large-scale, "top-down" and "good behavior" as well as computer-based business and control as a stakeholder in the power grid and in a deregulated market. This is to be contrasted with the traditional prudence concept inherent in the state-of-the-art of conventional wind power systems, which can be described as small-scale, "bottom-up" and "good behavior" as a minor or even negligible actor in the power grid.

14. There is a great potential to benefit from at least one existing energy storage asset which can be situated—in an interconnected, but not necessarily synchronous, power grid—more than 1000 km away from the location where the wind energy is harnessed. The remote asset is:

14a) partly controlled according to dynamic operational values in the wind turbines, 14b) partly controlled according to its own dynamic operational values and its vicinity in the power grid, 14c) controlled with a time-scale and noise reduction which are more or less independent from the dynamic operational values in the wind turbines but with a time-scale which is selected in accordance with the location of (or electrical distance to) the energy storage asset.

15. There is a possibility to include a prime mover, e.g., driven by vegetable oil or diesel or gas, or the like, to the shaft of the rotating converter in the coactive converter:

15a) to carry out start-up procedures, if the power grid is completely down, i.e., a capability to recover a dead grid, so-called black grid start, and 15b) to assist in a power priming procedure.

16. There is a great advantage in using power cables to embody the C&T-grid, because line right-of-ways, ROW, are more easily obtained for cables than for overhead transmission lines. Power cables are a must for sub-sea for sea-based installations, but it is a great advantage to bury power cables all the way from the sea to the substation at the (sub)transmission level. The visual impact, as well as the levels of electromagnetic fields, EMFs, are negligible compared to those from overhead transmission lines.

17. It is a great advantage to embody the xM as a cable-based rotating machine as described in PCT Patent Publications WO 97/45919, WO 97/45907 and WO 00/67363 allowing a continuous mixed AC-DC-stress on the insulation system without a separate machine transformer.

Obviously, numerous modifications and variations of the present invention are possible in light of the above teachings. From the above description, it will be apparent that the invention disclosed herein provides novel and advantageous methods and mechanisms to operate and control wind turbines, wind farms and their co-operation with the electrical power grid and its stakeholders aiming at long-term business operations.

For example, the rotating AC machine (SM/xM) can be connected in other ways like with a fourth winding on the power transformer whereby the rotating AC machine can be a machine with traditional stator (armature) windings.

For example, IGBT-, GTO-, or SCR-converters can form other combinations with the rotating machines SM or xM to reduce the sensitivity to grid disturbances.

For example, some aspects of the priming procedure can be performed in various ways equivalent to those disclosed herein. Similar priming procedures can be performed on other renewables, such as solar electric power where the prime mover might be driven by any gases that hold energy. Those gases might be not only a simple source, such as air, which is compressed by using the rotating AC machine (SM/xM) as a motor during some time periods, but also a more complicated source like hydrogen which is produced by hydrolysis from temporarily available surplus electrical power and which is burned in a gas turbine used as a prime mover, all to stay within "renewables" regime. LNG, liquid natural gas, is of course a strategic option to complement "renewables" to form another type of "hybrid," but still with fairly low environmental impact due to its low carbon content, or more precise low $CO_2$ per kWh. It is therefore to be understood that within the scope of the appended claims, the invention may be practiced otherwise than as specifically described herein.

What is claimed is:

1. An intelligent coactive converter comprising:

an input line configured to receive electric power produced by a renewable facility, said electric power being inadequate to be applied directly to a standard frequency AC power grid due to at least one of insufficient voltage stiffness, and excessive power variability;

an output line configured to deliver enhanced electric power to said standard frequency AC power grid at, at least, one point-of-connection in a grid area-of-connection, said enhanced electric power being enhanced with regard to at least one of voltage stiffness and power variability with respect to a delivery to said standard frequency AC power grid of said electric power from said renewable facility;

a constant-frequency output, rotating AC machine, yM, electrically coupled to said output line a controller configured to control an operational state of said yM, and corresponding predetermined amounts of active and reactive power provided by, or consumed by, said yM to the standard frequency AC power grid so as to prime the electric power from the renewable facility and enable a delivery of the enhanced electric power to said at least one point-of-connection.

2. The intelligent coactive converter of claim 1, wherein: said input line is coupled to a collection and transmission grid that collects power generated from the renewable facility and another renewable facility.

3. The intelligent coactive converter of claim 2, wherein: said another renewable facility being at least one of a wind turbine facility, a solar cell facility, a fuel cell facility, and a gas turbine facility.

4. The intelligent coactive converter of claim 1, wherein: said yM is at least one of an xM and a synchronous machine.

5. The intelligent coactive converter of claim 1, wherein said controller comprises:
a communication mechanism configured to coordinate power production levels between the renewable facility and at least one of a virtual energy storage facility and the constant-frequency output, rotating AC machine.

6. The intelligent coactive converter of claim 1, wherein: said input line is configured to connect directly to said standard frequency AC power grid in said area-of-connection; and
an output of said yM being coupled to said output only.

7. The intelligent coactive converter of claim 6, wherein: the point-of-connection at which the output line connects to the standard frequency AC power grid being separate from, but electrically close to, another point-of-connection within said area-of-connection at which said input line connects to said standard frequency AC power grid.

8. The intelligent coactive converter of claim 1, wherein: the yM is configured to supply and consume power via said output line so as to improve voltage stiffness of the standard frequency AC power grid in the area-of-connection and thus aid in priming the electric power produced by the renewable facility.

9. The intelligent coactive converter of claim 1, wherein: the yM is configured to supply and consume power via said output line so as to reduce variability in active power fed to the standard frequency AC power grid as compared to a variability in the electric power produced only by the renewable facility.

10. The intelligent coactive converter of claim 5, further comprising:
a prime mover configured to drive the yM.

11. The intelligent coactive converter of claim 10, wherein:
the controller is configured to control an operation of the prime mover and coordinate communications with the virtual energy storage facility so as to ensure a predetermined amount of power is delivered to the standard frequency AC power grid on behalf of said renewable facility.

12. The intelligent coactive converter of claim 10, wherein:
the controller is configured to coordinate a sale of the electric power from the renewable facility on a power exchange.

13. The intelligent coactive converter of claim 6, further comprising:
a power transformer coupled to the output line.

14. The intelligent coactive converter of claim 13, wherein:
the power transformer being at least one of
a On-Line Tap-Changer transformer,
two two-winding 3-Phase (2*3Φ) transformers,
a three-winding 3-phase (2*3Φ) transformer,
a Phase Shifting Transformer (PST),
a Thyristor Controlled Phase-Angle Regulating (TCPAR) Transformer, and
a cable-based transformer.

15. The intelligent coactive converter of claim 1, wherein: the yM is a standard frequency AC synchronous machine.

16. The intelligent coactive converter of claim 15, further comprising:
a prime mover configured to drive the standard frequency AC synchronous machine, wherein
the standard frequency AC synchronous machine has a rotor that is attached to a shaft of the prime mover and having a moment of inertia, said moment of inertia being a source of energy available to aid in priming the electrical power from the renewable facility.

17. The intelligent coactive converter of claim 15, wherein:
said input line couples directly to said standard frequency AC power grid in said area-of-connection;
the standard frequency AC synchronous machine is positioned an electrically short distance from where the input line connects to the standard frequency AC power grid so as to improve a voltage stiffness of said standard frequency AC power grid and reduce a reactive power variability in the electric power produced by the renewable facility as it is applied to the standard frequency AC power grid.

18. The intelligent coactive converter of claim 1, wherein:
the yM is a standard frequency AC constant-frequency machine with a variable speed operation capability, including
a multi-phase stator winding coupled to the standard frequency AC power grid,
a rotor winding disposed in a rotating magnetic core attached to a shaft,
a power semiconductor converter configured as a power converter connected between a multi-phase voltage supply and the rotor winding, and
a processor configured to control an operation of the power semiconductor converter.

19. The intelligent coactive converter of claim 18, further comprising:
a prime mover having the shaft coupled to the rotor winding configured to drive the shaft of standard frequency AC constant-frequency machine with a variable speed operation capability; and
the standard frequency AC constant-frequency machine with a variable speed operation capability is configured to exhibit moment of inertia associated with a magnetic core thereof being attached to a shaft of the prime mover.

20. The intelligent coactive converter of claim 18, wherein:
the standard frequency AC constant-frequency machine with variable speed operation capability being configured to
provide negligible variability in an amount of active power fed to the standard frequency AC power grid, and
eliminate the active power variability in the electric power produced by the renewable facility.

21. The intelligent coactive converter of claim 18, wherein:
the standard frequency AC constant-frequency machine with variable speed operation capability being configured to
provide voltage stiffness at a short electrical distance from points-of-connection feeding the electric power from the renewable facilities to the standard frequency AC power grid, and
eliminate reactive power variability in the electric power produced by the renewable facility.

22. The intelligent coactive converter of claim 15, wherein:
the yM is configured to provide short circuit power to the standard frequency AC power grid.

23. The intelligent coactive converter of claim 15, wherein
the yM is embodied as a power flow controller having
a rotating AC machine connected as a shunt machine, and
a rotating AC machine connected as a series machine with a common shaft.

24. The intelligent coactive converter of claim 23, wherein:
at least one of the shunt machine and the series machine includes,
a multi-phase stator winding coupled to the standard frequency AC power grid,
a rotor winding disposed in a rotating magnetic core attached to a drive shaft,
a power semiconductor converter configured as a power converter connected between a multi-phase voltage supply and the rotor winding, and
a processor configured to control an operation of the power semiconductor converter.

25. The intelligent coactive converter of claim 24, wherein:
the controller is configured to determine a timing of when to fire pulses employed in the power semiconductor converter so that
the shunt machine supplies at least one of reactive power with standard frequency AC to the AC power grid, and
active power with standard frequency AC to the AC power grid.

26. The intelligent coactive converter of claim 18, wherein:
the controller is configured to determine a timing of when to fire pulses employed in the power semiconductor converter so that
the shunt machine supplies at least one of reactive power with standard frequency AC to the AC power grid, and
active power with standard frequency AC to the AC power grid.

27. The intelligent coactive converter of claim 24, wherein:
the controller is configured to determine a timing of when to fire pulses employed in the power semiconductor converter so that
the series machine supplies at least one of reactive power with standard frequency AC to the AC power grid, and
active power with standard frequency AC to the AC power grid.

28. The intelligent coactive converter of claim 18, wherein:
the controller is configured to determine a timing of when to fire pulses employed in the power semiconductor converter so that
the series machine supplies at least one of reactive power with standard frequency AC to the AC power grid, and
active power with standard frequency AC to the AC power grid.

29. The intelligent coactive converter of claim 15, wherein:
the standard frequency AC synchronous machine includes
a multi-phase stator winding coupled to the standard frequency AC power grid,
a rotor winding disposed in a rotating magnetic core attached to a drive shaft,
a power semiconductor converter configured as a power converter connected between a multi-phase voltage supply and the rotor winding, and
a processor configured to determine a timing of when to fire pulses employed in the power semiconductor converter.

30. The intelligent coactive converter of claim 1, wherein:
the electric power produced by the renewable facility is collected and transmitted via a standard frequency AC power grid,
the standard frequency AC power grid is at least one of
a meshed power grid,
a radial power grid, and
a mixed meshed and radial power grid.

31. The intelligent coactive converter of claim 1, wherein:
the electric power produced by the renewable facility is collected and transmitted via a low frequency AC power grid,
the low frequency AC power grid is at least one of
a meshed power grid,
a radial power grid, and
a mixed meshed and radial power grid.

32. The intelligent coactive converter of claim 1, wherein:
the electric power produced by the renewable facility is collected and transmitted via a DC power grid,
the DC power grid is at least one of
a meshed power grid,
a radial power grid, and
a mixed meshed and radial power grid.

33. The intelligent coactive converter of claim 32, further comprising:
a DC-AC power semiconductor converter configured to convert the electric power produced by the renewable facility from DC to AC.

34. The intelligent coactive converter of claim 1, wherein:
said output line includes a power transformer configured to receive the electric power from the renewable facility and the yM and provide a composite output power to the standard frequency AC power grid at said point-of-connection.

35. The intelligent coactive converter of claim 34, further comprising:
a prime mover configured to drive the yM, wherein an electrical output of said prime mover being applied as an additional electrical power to said power transformer.

36. The intelligent coactive converter of claim 35, wherein:
one set of windings in a stator of the rotating AC machine stator and a winding in the power transformer being configured to be stressed by a mix of AC and DC voltage.

37. The intelligent coactive converter in claim 35, wherein:

the yM includes a stator winding that includes a cable having an insulation system configured for high voltage use and a mix of AC and DC voltage; and a winding of the power transformer being made of a same insulation system as said cable in said stator winding.

38. The intelligent coactive converter of claim 1, wherein:

the yM includes a prime mover; and the controller is configured to the control, an air-gap flux $\overline{\Phi}_{\delta\_yM}$ and the stator current $\overline{I}_{S\_yM}$ in the rotating AC machine to provide at least one of reactive power, with standard frequency AC to the standard frequency AC power grid, according to an equation $$Q_{eld\_yM} = Im\{3j\omega \cdot \overline{\Phi}_{\delta\_yM} \overline{I}^*_{S\_yM}\}$$

and active power, from the prime mover, with standard frequency AC to the standard frequency AC power grid according to an equation $$P_{eld\_yM} = Re\{3j\omega \cdot \overline{\Phi}_{\delta\_yM} \overline{I}^*_{S\_yM}\}.$$

39. The intelligent coactive converter of claim 1, wherein:

the renewable facility includes a wind turbine, k; and the controller is configured to control, an air-gap flux $\overline{\Phi}_{\delta\_k}$ and the stator current $\overline{I}_{S\_k}$ in a rotating AC machine in the wind turbine, k, to provide reactive power as $$Q_{eld\_gen\_k} = Im\{3j\omega_k \cdot \overline{\Phi}_{\delta\_k} \overline{I}^*_{S\_k}\}$$

and active power as $$P_{eld\_gen\_k} = Re\{3j\omega_k \cdot \overline{\Phi}_{\delta\_k} \overline{I}^*_{S\_k}\}$$

with variable frequency AC ($\omega_k$) to a generator driven by the wind turbine, k.

40. An intelligent coactive converter coupled to a standard frequency AC power grid and configured to enhance electric power produced by a renewable facility and collected and transmitted via a DC power grid, comprising:

an input line configured to receive electric power produced by said renewable facility, said electric power being inadequate to be applied directly to the standard frequency AC power grid due to at least one of insufficient voltage stiffness, and excessive power variability;

an output line configured to deliver enhanced electric power to said standard frequency AC power grid at, at least, one point-of-connection in a grid area-of-connection, said enhanced electric power being enhanced with regard to at least one of voltage stiffness and power variability with respect to a delivery to said standard frequency AC power grid of said electric power from said renewable facility;

a constant-frequency output, rotating AC machine, yM, electrically coupled to said output line, including a multi-phase stator winding being configured to couple to at least one of the power transformer and the standard frequency AC power grid, a rotor winding located in a rotating magnetic core attached to a shaft, and a power semiconductor converter arranged as a converter connected between a multi-phase voltage supply and the rotor winding;

a controller configured to control an operational state of said yM, and corresponding predetermined amounts of active and reactive power provided by, or consumed by, said yM to the standard frequency AC power grid so as to prime the electric power from the renewable facility and enable a delivery of the enhanced electric power to said at least one point-of-connection;

a DC-AC power semiconductor converter configured to convert the electric power from the DC power grid from DC to AC; and a power transformer coupled to the standard frequency AC power grid and configured to provide the enhanced electric power to the AC power grid.

41. The intelligent coactive converter of claim 40, wherein:

said yM is at least one of an xM and a synchronous machine.

42. The intelligent coactive converter of claim 40, wherein said controller comprises:

a communication mechanism configured to coordinate power production levels between the renewable facility and at least one of a virtual energy storage facility and the constant-frequency output, rotating AC machine.

43. The intelligent coactive converter of claim 40, wherein:

the yM is configured to supply and consume power via said output line so as to improve voltage stiffness of the standard frequency AC power grid in the area-of-connection and thus aid in priming the electric power produced by the renewable facility.

44. The intelligent coactive converter of claim 40, wherein:

the yM is configured to supply and consume power via said output line so as to reduce variability in active power fed to the standard frequency AC power grid as compared to a variability in the electric power produced only by the renewable facility.

45. The intelligent coactive converter of claim 40, wherein:

the yM is a standard frequency AC synchronous machine.

46. The intelligent coactive converter of claim 45, further comprising:

a prime mover configured to drive the standard frequency AC synchronous machine, wherein the standard frequency AC synchronous machine has a rotor that is attached to a shaft of the prime mover and having a moment of inertia, said moment of inertia being a source of energy available to aid in priming the electrical power from the renewable facility.

47. The intelligent coactive converter of claim 45, wherein:

the yM is configured to provide short circuit power to the standard frequency AC power grid.

48. The intelligent coactive converter of claim 45, wherein:

the standard frequency AC synchronous machine includes a multi-phase stator winding coupled to the standard frequency AC power grid, a rotor winding disposed in a rotating magnetic core attached to a drive shaft, a power semiconductor converter configured as a power converter connected between a multi-phase voltage supply and the rotor winding, and a processor configured to determine a timing of when to fire pulses employed in the power semiconductor converter.

49. The intelligent coactive converter of claim 40, wherein:
the yM is a standard frequency AC constant-frequency machine with a variable speed operation capability, including
a multi-phase stator winding coupled to the standard frequency AC power grid,
a rotor winding disposed in a rotating magnetic core attached to a shaft,
a power semiconductor converter configured as a power converter connected between a multi-phase voltage supply and the rotor winding, and
a processor configured to control an operation of the power semiconductor converter.

50. The intelligent coactive converter of claim 49, further comprising:
a prime mover having the shaft coupled to the rotor winding configured to drive the shaft of standard frequency AC constant-frequency machine with a variable speed operation capability; and
the standard frequency AC constant-frequency machine with a variable speed operation capability is configured to exhibit moment of inertia associated with a magnetic core thereof being attached to a shaft of the prime mover.

51. The intelligent coactive converter of claim 49, wherein:
the standard frequency AC constant-frequency machine with variable speed operation capability being configured to provide at least one of
negligible variability in an amount of active power fed to the standard frequency AC power grid, and
voltage stiffness at a short electrical distance from points-of-connection feeding the electric power from the renewable facilities to the standard frequency AC power grid.

52. The intelligent coactive converter of claim 40, wherein:
one set of windings in a stator of the rotating AC machine stator and a winding in the power transformer being configured to be stressed by a mix of AC and DC voltage.

53. The intelligent coactive converter of claim 40, wherein:
the yM includes a stator winding that includes a cable having an insulation system configured for high voltage use and a mix of AC and DC voltage; and
a winding of the power transformer being made of a same insulation system as said cable in said stator winding.

54. The intelligent coactive converter of claim 40, wherein:
the yM, and the power transformer each being 2*3Φ.

55. The intelligent coactive converter of claim 40, wherein:
the yM includes a prime mover; and
the controller is configured to the control, an air-gap flux $\overline{\Phi}_{\delta\_yM}$ and the stator current $\overline{I}_{S_{yM}}$ in the rotating AC machine to provide at least one of
reactive power, with standard frequency AC to the standard frequency AC power grid, according to an equation $$Q_{eld\_yM}=Im\{3j\omega\cdot\overline{\Phi}_{\delta\_yM}\cdot\overline{I}^*_{S\_yM}\}.$$

and
active power, from the prime mover, with standard frequency AC to the standard frequency AC power grid according to an equation $$P_{eldyM}=Re\{3j\omega\cdot\overline{\Phi}_{\delta\_yM}\cdot\overline{I}^*_{S\_yM}\}.$$

56. The intelligent coactive converter of claim 40, wherein:
the renewable facility includes a wind turbine, k; and
the controller is configured to control, an air-gap flux $\overline{\Phi}_{\delta\_yM}$ and the stator current $\overline{I}_{S\_k}$ in a rotating AC machine in the
wind turbine, k, to provide reactive power as $$Q_{eld\_gen\_k}=Im\{3j\omega_k\cdot\overline{\Phi}_{\delta\_k}=\overline{I}^*_{S\_k}\}$$

and
active power as $$P_{eld\_gen\_k}=Re\{3j\Phi_k\cdot\overline{\Phi}_{\delta\_k}\cdot\overline{I}^*_{S\_k}\}$$

with variable frequency AC ($\Phi_k$) to a generator driven by the wind turbine, k.

* * * * *